(12) United States Patent
Brooker et al.

(10) Patent No.: US 10,884,812 B2
(45) Date of Patent: Jan. 5, 2021

(54) PERFORMANCE-BASED HARDWARE EMULATION IN AN ON-DEMAND NETWORK CODE EXECUTION SYSTEM

(71) Applicant: Amazon Technologies, Inc., Seattle, WA (US)

(72) Inventors: Marc John Brooker, Seattle, WA (US); Philip Daniel Piwonka, Seattle, WA (US); Niall Mullen, Seattle, WA (US); Mikhail Danilov, Sammamish, WA (US); Holly Mesrobian, Bellevue, WA (US); Timothy Allen Wagner, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/219,842

(22) Filed: Dec. 13, 2018

(65) Prior Publication Data
US 2020/0192707 A1 Jun. 18, 2020

(51) Int. Cl.
  *G06F 9/50* (2006.01)
  *G06F 8/75* (2018.01)
  *G06F 9/455* (2018.01)
(52) U.S. Cl.
  CPC ............... *G06F 9/505* (2013.01); *G06F 8/75* (2013.01); *G06F 9/45533* (2013.01);
  (Continued)
(58) Field of Classification Search
  CPC .................................................. G06F 9/505
  See application file for complete search history.

(56) References Cited

U.S. PATENT DOCUMENTS 4,949,254 A 8/1990 Shorter
5,283,888 A 2/1994 Dao et al.
(Continued)

FOREIGN PATENT DOCUMENTS

EP 2663052 A1 11/2013
JP 2002287974 A 10/2002
(Continued)

OTHER PUBLICATIONS

International Search Report and Written Opinion for International Application No. PCT/US2019/065365 dated Mar. 19, 2020, in 15 pages.
(Continued)

*Primary Examiner* — Sisley N Kim
(74) *Attorney, Agent, or Firm* — Knobbe Martens Olson & Bear LLP

(57) ABSTRACT

Systems and methods are described for providing performance-based hardware emulation in an on-demand network code execution system. A user may generate a task on the system by submitting code. The system may determine, based on the code or its execution, that the code executes more efficiently if certain functionality is available, such as an extension to a processor's instruction set. The system may further determine that it can provide the needed functionality using various computing resources, which may include physical hardware, emulated hardware (e.g., a virtual machine), or combinations thereof. The system may then determine and provide a set of computing resources to use when executing the user-submitted code, which may be based on factors such as availability, cost, estimated performance, desired performance, or other criteria. The system may also migrate code from one set of computing resources to another, and may analyze demand and project future computing resource needs.

21 Claims, 6 Drawing Sheets

(52) U.S. Cl.
CPC .......... *G06F 9/5044* (2013.01); *G06F 9/5055* (2013.01); *G06F 9/5077* (2013.01); *G06F 9/5088* (2013.01); *G06F 2009/4557* (2013.01)

(56) References Cited

U.S. PATENT DOCUMENTS

| | | | |
|---|---|---|---|
| 5,970,488 A | 10/1999 | Crowe et al. |
| 6,385,636 B1 | 5/2002 | Suzuki |
| 6,463,509 B1 | 10/2002 | Teoman et al. |
| 6,501,736 B1 | 12/2002 | Smolik et al. |
| 6,523,035 B1 | 2/2003 | Fleming et al. |
| 6,708,276 B1 | 3/2004 | Yarsa et al. |
| 7,036,121 B1 | 4/2006 | Casabona et al. |
| 7,590,806 B2 | 9/2009 | Harris et al. |
| 7,665,090 B1 | 2/2010 | Tormasov et al. |
| 7,707,579 B2 | 4/2010 | Rodriguez |
| 7,730,464 B2 | 6/2010 | Trowbridge |
| 7,774,191 B2 | 8/2010 | Berkowitz et al. |
| 7,823,186 B2 | 10/2010 | Pouliot |
| 7,886,021 B2 | 2/2011 | Scheifler et al. |
| 8,010,990 B2 | 8/2011 | Ferguson et al. |
| 8,024,564 B2 | 9/2011 | Bassani et al. |
| 8,046,765 B2 | 10/2011 | Cherkasova et al. |
| 8,051,180 B2 | 11/2011 | Mazzaferri et al. |
| 8,051,266 B2 | 11/2011 | DeVal et al. |
| 8,065,676 B1 | 11/2011 | Sahai et al. |
| 8,065,682 B2 | 11/2011 | Baryshnikov et al. |
| 8,095,931 B1 | 1/2012 | Chen et al. |
| 8,127,284 B2 | 2/2012 | Meijer et al. |
| 8,146,073 B2 | 3/2012 | Sinha |
| 8,166,304 B2 | 4/2012 | Murase et al. |
| 8,171,473 B2 | 5/2012 | Lavin |
| 8,209,695 B1 | 6/2012 | Pruyne et al. |
| 8,219,987 B1 | 7/2012 | Vlaovic et al. |
| 8,321,554 B2 | 11/2012 | Dickinson |
| 8,321,558 B1 | 11/2012 | Sirota et al. |
| 8,336,079 B2 | 12/2012 | Budko et al. |
| 8,352,608 B1 | 1/2013 | Keagy et al. |
| 8,387,075 B1 | 2/2013 | McCann et al. |
| 8,429,282 B1 | 4/2013 | Ahuja |
| 8,448,165 B1 | 5/2013 | Conover |
| 8,490,088 B2 | 7/2013 | Tang |
| 8,555,281 B1 | 10/2013 | Van Dijk et al. |
| 8,566,835 B2 | 10/2013 | Wang et al. |
| 8,613,070 B1 | 12/2013 | Borzycki et al. |
| 8,631,130 B2 | 1/2014 | Jackson |
| 8,677,359 B1 | 3/2014 | Cavage et al. |
| 8,694,996 B2 | 4/2014 | Cawlfield et al. |
| 8,700,768 B2 | 4/2014 | Benari |
| 8,719,415 B1 | 5/2014 | Sirota et al. |
| 8,725,702 B1 | 5/2014 | Raman et al. |
| 8,756,696 B1 | 6/2014 | Miller |
| 8,769,519 B2 | 7/2014 | Leitman et al. |
| 8,799,236 B1 | 8/2014 | Azari et al. |
| 8,799,879 B2 | 8/2014 | Wright et al. |
| 8,806,468 B2 | 8/2014 | Meijer et al. |
| 8,819,679 B2 | 8/2014 | Agarwal et al. |
| 8,825,863 B2 | 9/2014 | Hansson et al. |
| 8,825,964 B1 | 9/2014 | Sopka et al. |
| 8,839,035 B1 | 9/2014 | Dimitrovich et al. |
| 8,850,432 B2 | 9/2014 | Mcgrath et al. |
| 8,874,952 B2 | 10/2014 | Tameshige et al. |
| 8,904,008 B2 | 12/2014 | Calder et al. |
| 8,997,093 B2 | 3/2015 | Dimitrov |
| 9,027,087 B2 | 5/2015 | Ishaya et al. |
| 9,038,068 B2 | 5/2015 | Engle et al. |
| 9,052,935 B1 | 6/2015 | Rajaa |
| 9,086,897 B2 | 7/2015 | Oh et al. |
| 9,092,837 B2 | 7/2015 | Bala et al. |
| 9,098,528 B2 | 8/2015 | Wang |
| 9,110,732 B1 | 8/2015 | Forschmiedt et al. |
| 9,110,770 B1 | 8/2015 | Raju et al. |
| 9,111,037 B1 | 8/2015 | Nalis et al. |
| 9,112,813 B2 | 8/2015 | Jackson |
| 9,141,410 B2 | 9/2015 | Leafe et al. |
| 9,146,764 B1 | 9/2015 | Wagner |
| 9,152,406 B2 | 10/2015 | De et al. |
| 9,164,754 B1 | 10/2015 | Pohlack |
| 9,183,019 B2 | 11/2015 | Kruglick |
| 9,208,007 B2 | 12/2015 | Harper et al. |
| 9,218,190 B2 | 12/2015 | Anand et al. |
| 9,223,561 B2 | 12/2015 | Orveillon et al. |
| 9,223,966 B1 | 12/2015 | Satish et al. |
| 9,250,893 B2 | 2/2016 | Blahaerath et al. |
| 9,268,586 B2 | 2/2016 | Voccio et al. |
| 9,298,633 B1 | 3/2016 | Zhao et al. |
| 9,317,689 B2 | 4/2016 | Aissi |
| 9,323,556 B2 | 4/2016 | Wagner |
| 9,361,145 B1 | 6/2016 | Wilson et al. |
| 9,413,626 B2 | 8/2016 | Reque et al. |
| 9,436,555 B2 | 9/2016 | Dornemann et al. |
| 9,461,996 B2 | 10/2016 | Hayton et al. |
| 9,471,775 B1 | 10/2016 | Wagner et al. |
| 9,483,335 B1 | 11/2016 | Wagner et al. |
| 9,489,227 B2 | 11/2016 | Oh et al. |
| 9,497,136 B1 | 11/2016 | Ramarao et al. |
| 9,501,345 B1 | 11/2016 | Lietz et al. |
| 9,514,037 B1 | 12/2016 | Dow et al. |
| 9,537,788 B2 | 1/2017 | Reque et al. |
| 9,575,798 B2 | 2/2017 | Terayama et al. |
| 9,588,790 B1 | 3/2017 | Wagner et al. |
| 9,594,590 B2 | 3/2017 | Hsu |
| 9,596,350 B1 | 3/2017 | Dymshyts et al. |
| 9,600,312 B2 | 3/2017 | Wagner et al. |
| 9,628,332 B2 | 4/2017 | Bruno, Jr. et al. |
| 9,635,132 B1 | 4/2017 | Lin et al. |
| 9,652,306 B1 | 5/2017 | Wagner et al. |
| 9,652,617 B1 | 5/2017 | Evans et al. |
| 9,654,508 B2 | 5/2017 | Barton et al. |
| 9,661,011 B1 | 5/2017 | Van Horenbeeck et al. |
| 9,678,773 B1 | 6/2017 | Wagner et al. |
| 9,678,778 B1 | 6/2017 | Youseff |
| 9,703,681 B2 | 7/2017 | Taylor et al. |
| 9,715,402 B2 | 7/2017 | Wagner et al. |
| 9,727,725 B2 | 8/2017 | Wagner et al. |
| 9,733,967 B2 | 8/2017 | Wagner et al. |
| 9,760,387 B2 | 9/2017 | Wagner et al. |
| 9,767,271 B2 | 9/2017 | Ghose |
| 9,785,476 B2 | 10/2017 | Wagner et al. |
| 9,787,779 B2 | 10/2017 | Frank et al. |
| 9,811,363 B1 | 11/2017 | Wagner |
| 9,811,434 B1 | 11/2017 | Wagner |
| 9,830,175 B1 | 11/2017 | Wagner |
| 9,830,193 B1 | 11/2017 | Wagner et al. |
| 9,830,449 B1 | 11/2017 | Wagner |
| 9,864,636 B1 | 1/2018 | Patel et al. |
| 9,910,713 B2 | 3/2018 | Wisniewski et al. |
| 9,921,864 B2 | 3/2018 | Singaravelu et al. |
| 9,928,108 B1 | 3/2018 | Wagner et al. |
| 9,929,916 B1 | 3/2018 | Subramanian et al. |
| 9,930,103 B2 | 3/2018 | Thompson |
| 9,930,133 B2 | 3/2018 | Susarla et al. |
| 9,952,896 B2 | 4/2018 | Wagner et al. |
| 9,977,691 B2 | 5/2018 | Marriner et al. |
| 9,979,817 B2 | 5/2018 | Huang et al. |
| 10,002,026 B1 | 6/2018 | Wagner |
| 10,013,267 B1 | 7/2018 | Wagner et al. |
| 10,042,660 B2 | 8/2018 | Wagner et al. |
| 10,048,974 B1 | 8/2018 | Wagner et al. |
| 10,061,613 B1 | 8/2018 | Brooker et al. |
| 10,067,801 B1 | 9/2018 | Wagner |
| 10,102,040 B2 | 10/2018 | Marriner et al. |
| 10,108,443 B2 | 10/2018 | Wagner et al. |
| 10,139,876 B2 | 11/2018 | Lu et al. |
| 10,140,137 B2 | 11/2018 | Wagner |
| 10,162,672 B2 | 12/2018 | Wagner et al. |
| 10,162,688 B2 | 12/2018 | Wagner |
| 10,203,990 B2 | 2/2019 | Wagner et al. |
| 10,248,467 B2 | 4/2019 | Wisniewski et al. |
| 10,277,708 B2 | 4/2019 | Wagner et al. |
| 10,303,492 B1 | 5/2019 | Wagner et al. |
| 10,353,678 B1 | 7/2019 | Wagner |
| 10,353,746 B2 | 7/2019 | Reque et al. |
| 10,365,985 B2 | 7/2019 | Wagner |

(56) References Cited

U.S. PATENT DOCUMENTS

| | | |
|---|---|---|
| 10,387,177 B2 | 8/2019 | Wagner et al. |
| 10,402,231 B2 | 9/2019 | Marriner et al. |
| 10,437,629 B2 | 10/2019 | Wagner et al. |
| 10,445,140 B1 | 10/2019 | Sagar et al. |
| 10,528,390 B2 | 1/2020 | Brooker et al. |
| 10,552,193 B2 | 2/2020 | Wagner et al. |
| 10,564,946 B1 | 2/2020 | Wagner et al. |
| 10,572,375 B1 | 2/2020 | Wagner |
| 10,592,269 B2 | 3/2020 | Wagner et al. |
| 10,623,476 B2 | 4/2020 | Thompson |
| 10,649,749 B1 | 5/2020 | Brooker et al. |
| 10,691,498 B2 | 6/2020 | Wagner |
| 10,713,080 B1 | 7/2020 | Brooker et al. |
| 2001/0044817 A1 | 11/2001 | Asano et al. |
| 2002/0120685 A1 | 8/2002 | Srivastava et al. |
| 2002/0172273 A1 | 11/2002 | Baker et al. |
| 2003/0071842 A1 | 4/2003 | King et al. |
| 2003/0084434 A1 | 5/2003 | Ren |
| 2003/0191795 A1 | 10/2003 | Bernardin et al. |
| 2003/0229794 A1 | 12/2003 | James, II et al. |
| 2004/0003087 A1 | 1/2004 | Chambliss et al. |
| 2004/0044721 A1 | 3/2004 | Song et al. |
| 2004/0049768 A1 | 3/2004 | Matsuyama et al. |
| 2004/0098154 A1 | 5/2004 | McCarthy |
| 2004/0158551 A1 | 8/2004 | Santosuosso |
| 2004/0205493 A1 | 10/2004 | Simpson et al. |
| 2004/0249947 A1 | 12/2004 | Novaes et al. |
| 2004/0268358 A1 | 12/2004 | Darling et al. |
| 2005/0027611 A1 | 2/2005 | Wharton |
| 2005/0044301 A1 | 2/2005 | Vasilevsky et al. |
| 2005/0120160 A1 | 6/2005 | Plouffe et al. |
| 2005/0132167 A1 | 6/2005 | Longobardi |
| 2005/0132368 A1 | 6/2005 | Sexton et al. |
| 2005/0149535 A1 | 7/2005 | Frey et al. |
| 2005/0193113 A1 | 9/2005 | Kokusho et al. |
| 2005/0193283 A1 | 9/2005 | Reinhardt et al. |
| 2005/0237948 A1 | 10/2005 | Wan et al. |
| 2005/0257051 A1 | 11/2005 | Richard |
| 2006/0080678 A1 | 4/2006 | Bailey et al. |
| 2006/0123066 A1 | 6/2006 | Jacobs et al. |
| 2006/0129684 A1 | 6/2006 | Datta |
| 2006/0168174 A1 | 7/2006 | Gebhart et al. |
| 2006/0184669 A1 | 8/2006 | Vaidyanathan et al. |
| 2006/0200668 A1 | 9/2006 | Hybre et al. |
| 2006/0212332 A1 | 9/2006 | Jackson |
| 2006/0242647 A1 | 10/2006 | Kimbrel et al. |
| 2006/0248195 A1 | 11/2006 | Toumura et al. |
| 2007/0033085 A1 | 2/2007 | Johnson |
| 2007/0094396 A1 | 4/2007 | Takano et al. |
| 2007/0130341 A1 | 6/2007 | Ma |
| 2007/0174419 A1 | 7/2007 | O'Connell et al. |
| 2007/0192082 A1 | 8/2007 | Gaos et al. |
| 2007/0199000 A1 | 8/2007 | Shekhel et al. |
| 2007/0220009 A1 | 9/2007 | Morris et al. |
| 2007/0240160 A1 | 10/2007 | Paterson-Jones |
| 2007/0255604 A1 | 11/2007 | Seelig |
| 2008/0028409 A1 | 1/2008 | Cherkasova et al. |
| 2008/0052401 A1 | 2/2008 | Bugenhagen et al. |
| 2008/0052725 A1 | 2/2008 | Stoodley et al. |
| 2008/0082977 A1 | 4/2008 | Araujo et al. |
| 2008/0104247 A1 | 5/2008 | Venkatakrishnan et al. |
| 2008/0104608 A1 | 5/2008 | Hyser et al. |
| 2008/0115143 A1 | 5/2008 | Shimizu et al. |
| 2008/0126110 A1 | 5/2008 | Haeberle et al. |
| 2008/0126486 A1 | 5/2008 | Heist |
| 2008/0127125 A1 | 5/2008 | Anckaert et al. |
| 2008/0147893 A1 | 6/2008 | Marripudi et al. |
| 2008/0189468 A1 | 8/2008 | Schmidt et al. |
| 2008/0195369 A1 | 8/2008 | Duyanovich et al. |
| 2008/0201568 A1 | 8/2008 | Quinn et al. |
| 2008/0201711 A1 | 8/2008 | Amir Husain |
| 2008/0209423 A1 | 8/2008 | Hirai |
| 2009/0006897 A1 | 1/2009 | Sarsfield |
| 2009/0013153 A1 | 1/2009 | Hilton |
| 2009/0025009 A1 | 1/2009 | Brunswig et al. |
| 2009/0055810 A1 | 2/2009 | Kondur |
| 2009/0055829 A1 | 2/2009 | Gibson |
| 2009/0070355 A1 | 3/2009 | Cadarette et al. |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0177860 A1 | 7/2009 | Zhu et al. |
| 2009/0183162 A1 | 7/2009 | Kindel et al. |
| 2009/0193410 A1 | 7/2009 | Arthursson et al. |
| 2009/0198769 A1 | 8/2009 | Keller et al. |
| 2009/0204960 A1 | 8/2009 | Ben-Yehuda et al. |
| 2009/0204964 A1 | 8/2009 | Foley et al. |
| 2009/0222922 A1 | 9/2009 | Sidiroglou et al. |
| 2009/0271472 A1 | 10/2009 | Scheifler et al. |
| 2009/0288084 A1 | 11/2009 | Astete et al. |
| 2009/0300599 A1 | 12/2009 | Piotrowski |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0036925 A1 | 2/2010 | Haffner |
| 2010/0058342 A1 | 3/2010 | Machida |
| 2010/0058351 A1 | 3/2010 | Yahagi |
| 2010/0064299 A1 | 3/2010 | Kacin et al. |
| 2010/0070678 A1 | 3/2010 | Zhang et al. |
| 2010/0070725 A1 | 3/2010 | Prahlad et al. |
| 2010/0094816 A1 | 4/2010 | Groves, Jr. et al. |
| 2010/0106926 A1 | 4/2010 | Kandasamy et al. |
| 2010/0114825 A1 | 5/2010 | Siddegowda |
| 2010/0115098 A1 | 5/2010 | De Baer et al. |
| 2010/0122343 A1 | 5/2010 | Ghosh |
| 2010/0131936 A1 | 5/2010 | Cheriton |
| 2010/0131959 A1 | 5/2010 | Spiers et al. |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0257116 A1 | 10/2010 | Mehta et al. |
| 2010/0269109 A1 | 10/2010 | Cartales |
| 2010/0312871 A1 | 12/2010 | Desantis et al. |
| 2010/0325727 A1 | 12/2010 | Neystadt et al. |
| 2011/0010722 A1 | 1/2011 | Matsuyama |
| 2011/0029970 A1 | 2/2011 | Arasaratnam |
| 2011/0029984 A1 | 2/2011 | Norman et al. |
| 2011/0040812 A1 | 2/2011 | Phillips |
| 2011/0055378 A1 | 3/2011 | Ferris et al. |
| 2011/0055396 A1 | 3/2011 | DeHaan |
| 2011/0055683 A1 | 3/2011 | Jiang |
| 2011/0078679 A1 | 3/2011 | Bozek et al. |
| 2011/0099204 A1 | 4/2011 | Thaler |
| 2011/0099551 A1 | 4/2011 | Fahrig et al. |
| 2011/0131572 A1 | 6/2011 | Elyashev et al. |
| 2011/0134761 A1 | 6/2011 | Smith |
| 2011/0141124 A1 | 6/2011 | Halls et al. |
| 2011/0153727 A1 | 6/2011 | Li |
| 2011/0153838 A1 | 6/2011 | Belkine et al. |
| 2011/0154353 A1 | 6/2011 | Theroux et al. |
| 2011/0179162 A1 | 7/2011 | Mayo et al. |
| 2011/0184993 A1 | 7/2011 | Chawla et al. |
| 2011/0225277 A1 | 9/2011 | Freimuth et al. |
| 2011/0231680 A1 | 9/2011 | Padmanabhan et al. |
| 2011/0247005 A1 | 10/2011 | Benedetti et al. |
| 2011/0265164 A1 | 10/2011 | Lucovsky |
| 2011/0271276 A1 | 11/2011 | Ashok et al. |
| 2011/0276945 A1 | 11/2011 | Chasman et al. |
| 2011/0314465 A1 | 12/2011 | Smith et al. |
| 2011/0321033 A1 | 12/2011 | Kelkar et al. |
| 2011/0321051 A1 | 12/2011 | Rastogi |
| 2012/0011496 A1 | 1/2012 | Shimamura |
| 2012/0011511 A1 | 1/2012 | Horvitz et al. |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0072762 A1 | 3/2012 | Atchison et al. |
| 2012/0072914 A1 | 3/2012 | Ota |
| 2012/0079004 A1 | 3/2012 | Herman |
| 2012/0096271 A1 | 4/2012 | Ramarathinam et al. |
| 2012/0096468 A1 | 4/2012 | Chakravorty et al. |
| 2012/0102307 A1 | 4/2012 | Wong |
| 2012/0102333 A1 | 4/2012 | Wong |
| 2012/0102481 A1 | 4/2012 | Mani et al. |

(56) References Cited

U.S. PATENT DOCUMENTS

| | | |
|---|---|---|
| 2012/0102493 A1 | 4/2012 | Allen et al. |
| 2012/0110155 A1 | 5/2012 | Adlung et al. |
| 2012/0110164 A1 | 5/2012 | Frey et al. |
| 2012/0110570 A1 | 5/2012 | Jacobson et al. |
| 2012/0110588 A1 | 5/2012 | Bieswanger et al. |
| 2012/0131379 A1 | 5/2012 | Tameshige et al. |
| 2012/0144290 A1 | 6/2012 | Goldman et al. |
| 2012/0166624 A1 | 6/2012 | Suit et al. |
| 2012/0192184 A1 | 7/2012 | Burckart et al. |
| 2012/0197795 A1 | 8/2012 | Campbell et al. |
| 2012/0197958 A1 | 8/2012 | Nightingale et al. |
| 2012/0198442 A1 | 8/2012 | Kashyap et al. |
| 2012/0222038 A1 | 8/2012 | Katragadda et al. |
| 2012/0233464 A1 | 9/2012 | Miller et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0061220 A1 | 3/2013 | Gnanasambandam et al. |
| 2013/0067494 A1 | 3/2013 | Srour et al. |
| 2013/0080641 A1 | 3/2013 | Lui et al. |
| 2013/0097601 A1 | 4/2013 | Podvratnik et al. |
| 2013/0111032 A1 | 5/2013 | Alapati et al. |
| 2013/0111469 A1 | 5/2013 | B et al. |
| 2013/0124807 A1 | 5/2013 | Nielsen et al. |
| 2013/0132942 A1 | 5/2013 | Wang |
| 2013/0139152 A1 | 5/2013 | Chang et al. |
| 2013/0139166 A1 | 5/2013 | Zhang et al. |
| 2013/0151648 A1 | 6/2013 | Luna |
| 2013/0152047 A1 | 6/2013 | Moorthi et al. |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0179895 A1 | 7/2013 | Calder et al. |
| 2013/0185719 A1 | 7/2013 | Kar et al. |
| 2013/0185729 A1 | 7/2013 | Vasic et al. |
| 2013/0191924 A1 | 7/2013 | Tedesco |
| 2013/0198319 A1 | 8/2013 | Shen et al. |
| 2013/0198743 A1 | 8/2013 | Kruglick |
| 2013/0198748 A1 | 8/2013 | Sharp et al. |
| 2013/0198763 A1 | 8/2013 | Kunze et al. |
| 2013/0205092 A1 | 8/2013 | Roy et al. |
| 2013/0219390 A1 | 8/2013 | Lee et al. |
| 2013/0227097 A1 | 8/2013 | Yasuda et al. |
| 2013/0227534 A1 | 8/2013 | Ike et al. |
| 2013/0227563 A1 | 8/2013 | McGrath |
| 2013/0227641 A1 | 8/2013 | White et al. |
| 2013/0227710 A1 | 8/2013 | Barak et al. |
| 2013/0232480 A1 | 9/2013 | Winterfeldt et al. |
| 2013/0239125 A1 | 9/2013 | Iorio |
| 2013/0262556 A1 | 10/2013 | Xu et al. |
| 2013/0263117 A1 | 10/2013 | Konik et al. |
| 2013/0275376 A1 | 10/2013 | Hudlow et al. |
| 2013/0275958 A1 | 10/2013 | Ivanov et al. |
| 2013/0275969 A1 | 10/2013 | Dimitrov |
| 2013/0275975 A1 | 10/2013 | Masuda et al. |
| 2013/0283176 A1 | 10/2013 | Hoole et al. |
| 2013/0290538 A1 | 10/2013 | Gmach et al. |
| 2013/0291087 A1 | 10/2013 | Kailash et al. |
| 2013/0297964 A1 | 11/2013 | Hegdal et al. |
| 2013/0311650 A1 | 11/2013 | Brandwine et al. |
| 2013/0326506 A1 | 12/2013 | McGrath et al. |
| 2013/0339950 A1 | 12/2013 | Ramarathinam et al. |
| 2013/0346470 A1 | 12/2013 | Obstfeld et al. |
| 2013/0346946 A1 | 12/2013 | Pinnix |
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1 | 12/2013 | Barjatiya et al. |
| 2014/0007097 A1 | 1/2014 | Chin et al. |
| 2014/0019523 A1 | 1/2014 | Heymann et al. |
| 2014/0019735 A1 | 1/2014 | Menon et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0059209 A1 | 2/2014 | Alnoor |
| 2014/0059226 A1 | 2/2014 | Messerli et al. |
| 2014/0059552 A1 | 2/2014 | Cunningham et al. |
| 2014/0068568 A1 | 3/2014 | Wisnovsky |
| 2014/0068611 A1 | 3/2014 | McGrath et al. |
| 2014/0081984 A1 | 3/2014 | Sitsky et al. |
| 2014/0082165 A1 | 3/2014 | Marr et al. |
| 2014/0082201 A1 | 3/2014 | Shankari et al. |
| 2014/0101649 A1 | 4/2014 | Kamble et al. |
| 2014/0108722 A1 | 4/2014 | Lipchuk et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0137110 A1 | 5/2014 | Engle et al. |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0201735 A1 | 7/2014 | Kannan et al. |
| 2014/0207912 A1 | 7/2014 | Thibeault |
| 2014/0215073 A1 | 7/2014 | Dow et al. |
| 2014/0229221 A1 | 8/2014 | Shih et al. |
| 2014/0245297 A1 | 8/2014 | Hackett |
| 2014/0279581 A1 | 9/2014 | Devereaux |
| 2014/0280325 A1 | 9/2014 | Krishnamurthy et al. |
| 2014/0282559 A1 | 9/2014 | Verduzco et al. |
| 2014/0282615 A1 | 9/2014 | Cavage et al. |
| 2014/0282629 A1 | 9/2014 | Gupta et al. |
| 2014/0283045 A1 | 9/2014 | Brandwine et al. |
| 2014/0289286 A1 | 9/2014 | Gusak |
| 2014/0298295 A1 | 10/2014 | Overbeck |
| 2014/0304698 A1 | 10/2014 | Chigurapati et al. |
| 2014/0304815 A1 | 10/2014 | Maeda |
| 2014/0317617 A1 | 10/2014 | O'Donnell |
| 2014/0344457 A1 | 11/2014 | Bruno, Jr. et al. |
| 2014/0344736 A1 | 11/2014 | Ryman et al. |
| 2014/0380085 A1 | 12/2014 | Rash et al. |
| 2015/0033241 A1 | 1/2015 | Jackson et al. |
| 2015/0039891 A1 | 2/2015 | Ignatchenko et al. |
| 2015/0040229 A1 | 2/2015 | Chan et al. |
| 2015/0046926 A1 | 2/2015 | Kenchammana-Hosekote et al. |
| 2015/0052258 A1 | 2/2015 | Johnson et al. |
| 2015/0058914 A1 | 2/2015 | Yadav |
| 2015/0067830 A1 | 3/2015 | Johansson et al. |
| 2015/0074659 A1 | 3/2015 | Madsen et al. |
| 2015/0081885 A1 | 3/2015 | Thomas et al. |
| 2015/0106805 A1 | 4/2015 | Melander et al. |
| 2015/0120928 A1 | 4/2015 | Gummaraju et al. |
| 2015/0121391 A1 | 4/2015 | Wang |
| 2015/0134626 A1 | 5/2015 | Theimer et al. |
| 2015/0135287 A1 | 5/2015 | Medeiros et al. |
| 2015/0142952 A1 | 5/2015 | Bragstad et al. |
| 2015/0143381 A1 | 5/2015 | Chin et al. |
| 2015/0178110 A1 | 6/2015 | Li et al. |
| 2015/0186129 A1 | 7/2015 | Apte et al. |
| 2015/0188775 A1 | 7/2015 | Van Der Walt et al. |
| 2015/0199218 A1 | 7/2015 | Wilson et al. |
| 2015/0205596 A1 | 7/2015 | Hiltegen et al. |
| 2015/0227598 A1 | 8/2015 | Hahn et al. |
| 2015/0235144 A1 | 8/2015 | Gusev et al. |
| 2015/0242225 A1 | 8/2015 | Muller et al. |
| 2015/0254248 A1 | 9/2015 | Burns et al. |
| 2015/0256621 A1 | 9/2015 | Noda et al. |
| 2015/0261578 A1 | 9/2015 | Greden et al. |
| 2015/0289220 A1 | 10/2015 | Kim et al. |
| 2015/0309923 A1 | 10/2015 | Iwata et al. |
| 2015/0319160 A1 | 11/2015 | Ferguson et al. |
| 2015/0324229 A1 | 11/2015 | Valine |
| 2015/0332048 A1 | 11/2015 | Mooring et al. |
| 2015/0332195 A1 | 11/2015 | Jue |
| 2015/0350701 A1 | 12/2015 | Lemus et al. |
| 2015/0356294 A1 | 12/2015 | Tan et al. |
| 2015/0363181 A1 | 12/2015 | Alberti et al. |

(56) References Cited

U.S. PATENT DOCUMENTS

| | | |
|---|---|---|
| 2015/0370560 A1 | 12/2015 | Tan et al. |
| 2015/0371244 A1 | 12/2015 | Neuse et al. |
| 2015/0378762 A1 | 12/2015 | Saladi et al. |
| 2015/0378764 A1 | 12/2015 | Sivasubramanian et al. |
| 2015/0378765 A1 | 12/2015 | Singh et al. |
| 2015/0379167 A1 | 12/2015 | Griffith et al. |
| 2016/0011901 A1 | 1/2016 | Hurwitz et al. |
| 2016/0012099 A1 | 1/2016 | Tuatini et al. |
| 2016/0019536 A1 | 1/2016 | Ortiz et al. |
| 2016/0026486 A1 | 1/2016 | Abdallah |
| 2016/0048606 A1 | 2/2016 | Rubinstein et al. |
| 2016/0072727 A1 | 3/2016 | Leafe et al. |
| 2016/0077901 A1 | 3/2016 | Roth et al. |
| 2016/0098285 A1 | 4/2016 | Davis et al. |
| 2016/0100036 A1 | 4/2016 | Lo et al. |
| 2016/0117254 A1 | 4/2016 | Susarla et al. |
| 2016/0124665 A1 | 5/2016 | Jain et al. |
| 2016/0140180 A1 | 5/2016 | Park et al. |
| 2016/0191420 A1 | 6/2016 | Nagarajan et al. |
| 2016/0212007 A1 | 7/2016 | Alatorre et al. |
| 2016/0285906 A1 | 9/2016 | Fine et al. |
| 2016/0292016 A1 | 10/2016 | Bussard et al. |
| 2016/0294614 A1 | 10/2016 | Searle et al. |
| 2016/0306613 A1 | 10/2016 | Busi et al. |
| 2016/0350099 A1 | 12/2016 | Suparna et al. |
| 2016/0357536 A1 | 12/2016 | Firlik et al. |
| 2016/0364265 A1 | 12/2016 | Cao et al. |
| 2016/0371127 A1 | 12/2016 | Antony et al. |
| 2016/0371156 A1 | 12/2016 | Merriman |
| 2016/0378449 A1 | 12/2016 | Khazanchi et al. |
| 2016/0378554 A1 | 12/2016 | Gummaraju et al. |
| 2017/0041309 A1 | 2/2017 | Ekambaram et al. |
| 2017/0060615 A1 | 3/2017 | Thakkar et al. |
| 2017/0060621 A1 | 3/2017 | Whipple et al. |
| 2017/0068574 A1 | 3/2017 | Cherkasova et al. |
| 2017/0075749 A1 | 3/2017 | Ambichl et al. |
| 2017/0083381 A1 | 3/2017 | Cong et al. |
| 2017/0085447 A1 | 3/2017 | Chen et al. |
| 2017/0085591 A1 | 3/2017 | Ganda et al. |
| 2017/0093684 A1 | 3/2017 | Jayaraman et al. |
| 2017/0093920 A1 | 3/2017 | Ducatel et al. |
| 2017/0230499 A1 | 8/2017 | Mumick et al. |
| 2017/0272462 A1 | 9/2017 | Kraemer et al. |
| 2017/0286143 A1 | 10/2017 | Wagner et al. |
| 2017/0371724 A1 | 12/2017 | Wagner et al. |
| 2018/0046453 A1 | 2/2018 | Nair et al. |
| 2018/0046482 A1 | 2/2018 | Karve et al. |
| 2018/0060221 A1 | 3/2018 | Yim et al. |
| 2018/0067841 A1 | 3/2018 | Mahimkar |
| 2018/0121245 A1 | 5/2018 | Wagner et al. |
| 2018/0143865 A1 | 5/2018 | Wagner et al. |
| 2018/0239636 A1 | 8/2018 | Arora et al. |
| 2018/0253333 A1 | 9/2018 | Gupta |
| 2018/0275987 A1 | 9/2018 | Vandeputte |
| 2018/0309819 A1 | 10/2018 | Thompson |
| 2019/0072529 A1 | 3/2019 | Andrawes et al. |
| 2019/0102231 A1 | 4/2019 | Wagner |
| 2019/0108058 A1 | 4/2019 | Wagner et al. |
| 2019/0155629 A1 | 5/2019 | Wagner et al. |
| 2019/0171470 A1 | 6/2019 | Wagner |
| 2019/0179725 A1* | 6/2019 | Mital ............... G06F 9/455 |
| 2019/0196884 A1 | 6/2019 | Wagner |
| 2019/0227849 A1 | 7/2019 | Wisniewski et al. |
| 2019/0384647 A1 | 12/2019 | Reque et al. |
| 2019/0391834 A1 | 12/2019 | Mullen et al. |
| 2019/0391841 A1 | 12/2019 | Mullen et al. |
| 2020/0057680 A1 | 2/2020 | Marriner et al. |
| 2020/0104198 A1 | 4/2020 | Hussels et al. |
| 2020/0104378 A1 | 4/2020 | Wagner et al. |
| 2020/0110691 A1* | 4/2020 | Bryant ............. G06F 11/3414 |
| 2020/0142724 A1 | 5/2020 | Wagner et al. |

FOREIGN PATENT DOCUMENTS

| | | |
|---|---|---|
| JP | 2006-107599 A | 4/2006 |
| JP | 2007-538323 A | 12/2007 |
| JP | 2010-026562 A | 2/2010 |
| JP | 2011-233146 A | 11/2011 |
| JP | 2011257847 A | 12/2011 |
| JP | 2013-156996 A | 8/2013 |
| JP | 2014-525624 A | 9/2014 |
| JP | 2017-534107 A | 11/2017 |
| JP | 2017-534967 A | 11/2017 |
| JP | 2018-503896 A | 2/2018 |
| JP | 2018-512087 A | 5/2018 |
| JP | 2018-536213 A | 12/2018 |
| WO | WO 2008/114454 A1 | 9/2008 |
| WO | WO 2009/137567 A1 | 11/2009 |
| WO | WO 2012/039834 A1 | 3/2012 |
| WO | WO 2012/050772 A1 | 4/2012 |
| WO | WO 2013/106257 A1 | 7/2013 |
| WO | WO 2015/078394 A1 | 6/2015 |
| WO | WO 2015/108539 A1 | 7/2015 |
| WO | WO 2016/053950 A1 | 4/2016 |
| WO | WO 2016/053968 A1 | 4/2016 |
| WO | WO 2016/053973 A1 | 4/2016 |
| WO | WO 2016/090292 A1 | 6/2016 |
| WO | WO 2016/126731 A1 | 8/2016 |
| WO | WO 2016/164633 A1 | 10/2016 |
| WO | WO 2016/164638 A1 | 10/2016 |
| WO | WO 2017/059248 A1 | 4/2017 |
| WO | WO 2017/112526 A1 | 6/2017 |
| WO | WO 2017/172440 A1 | 10/2017 |
| WO | WO 2020/005764 A1 | 1/2020 |
| WO | WO 2020/069104 A1 | 4/2020 |

OTHER PUBLICATIONS

Anonymous: "Docker run reference", Dec. 7, 2015, XP055350246, Retrieved from the Internet: URL:https://web.archive.org/web/20151207111702/https:/docs.docker.com/engine/reference/run/ [retrieved on Feb. 28, 2017].

Adapter Pattern, Wikipedia, https://en.wikipedia.org/w/index.php?title=Adapter_pattern&oldid=654971255, [retrieved May 26, 2016], 6 pages.

Amazon, "AWS Lambda: Developer Guide", Retrieved from the Internet, Jun. 26, 2016, URL : http://docs.aws.amazon.com/lambda/latest/dg/lambda-dg.pdf, 346 pages.

Amazon, "AWS Lambda: Developer Guide", Retrieved from the Internet, 2019, URL : http://docs.aws.amazon.com/lambda/ latest/dg/lambda-dg.pdf, 521 pages.

Balazinska et al., Moirae: History-Enhanced Monitoring, Published: 2007, 12 pages.

Ben-Yehuda et al., "Deconstructing Amazon EC2 Spot Instance Pricing", ACM Transactions on Economics and Computation 1.3, 2013, 15 pages.

Bhadani et al., Performance evaluation of web servers using central load balancing policy over virtual machines on cloud, Jan. 2010, 4 pages.

CodeChef ADMIN discussion web page, retrieved from https://discuss.codechef.com/t/what-are-the-memory-limit-and-stack-size-on-codechef/14159, 2019.

CodeChef IDE web page, Code, Compile & Run, retrieved from https://www.codechef.com/ide, 2019.

Czajkowski, G., and L. Daynes, Multitasking Without Compromise: A Virtual Machine Evolution 47(4a):60-73, ACM SIGPLAN Notices—Supplemental Issue, Apr. 2012.

Das et al., Adaptive Stream Processing using Dynamic Batch Sizing, 2014, 13 pages.

Deis, Container, 2014, 1 page.

Dombrowski, M., et al., Dynamic Monitor Allocation in the Java Virtual Machine, JTRES '13, Oct. 9-11, 2013, pp. 30-37.

Dynamic HTML, Wikipedia page from date Mar. 27, 2015, retrieved using the WayBackMachine, from https://web.archive.org/web/20150327215418/https://en.wikipedia.org/wiki/Dynamic_HTML, 2015, 6 pages.

(56) References Cited

OTHER PUBLICATIONS

Espadas, J., et al., A Tenant-Based Resource Allocation Model for Scaling Software-as-a-Service Applications Over Cloud Computing Infrastructures, Future Generation Computer Systems, vol. 29, pp. 273-286, 2013.
Han et al., Lightweight Resource Scaling for Cloud Applications, 2012, 8 pages.
Hoffman, Auto scaling your website with Amazon Web Services (AWS)—Part 2, Cardinalpath, Sep. 2015, 15 pages.
http://discuss.codechef.com discussion web page from date Nov. 11, 2012, retrieved using the WayBackMachine, from https://web.archive.org/web/20121111040051/http://discuss.codechef.com/questions/2881 /why-are-simple-java-programs-using-up-so-much-space, 2012.
https://www.codechef.com code error help page from Jan. 2014, retrieved from https://www.codechef.com/JAN14/status/ERROR,va123, 2014.
http://www.codechef.com/ide web page from date Apr. 5, 2015, retrieved using the WayBackMachine, from https://web.archive.org/web/20150405045518/http://www.codechef.com/ide, 2015.
Kamga et al., Extended scheduler for efficient frequency scaling in virtualized systems, Jul. 2012, 8 pages.
Kato, et al. "Web Service Conversion Architecture of the Web Application and Evaluation"; Research Report from Information Processing Society, Apr. 3, 2006 with Machine Translation.
Kazempour et al., AASH: an asymmetry-aware scheduler for hypervisors, Jul. 2010, 12 pages.
Kraft et al., 10 performance prediction in consolidated virtualized environments, Mar. 2011, 12 pages.
Krsul et al., "VMPlants: Providing and Managing Virtual Machine Execution Environments for Grid Computing", Supercomputing, 2004. Proceedings of the ACM/IEEESC 2004 Conference Pittsburgh, PA, XP010780332, Nov. 6-12, 2004, 12 pages.
Meng et al., Efficient resource provisioning in compute clouds via VM multiplexing, Jun. 2010, 10 pages.
Merkel, "Docker: Lightweight Linux Containers for Consistent Development and Deployment", Linux Journal, vol. 2014 Issue 239, Mar. 2014, XP055171140, 16 pages.
Monteil, Coupling profile and historical methods to predict execution time of parallel applications. Parallel and Cloud Computing, 2013, <hal-01228236, pp. 81-89.
Nakajima, J., et al., Optimizing Virtual Machines Using Hybrid Virtualization, SAC'11, Mar. 21-25, 2011, TaiChung, Taiwan, pp. 573-578.
Qian, H., and D. Medhi, et al., Estimating Optimal Cost of Allocating Virtualized Resources With Dynamic Demand, ITC 2011, Sep. 2011, pp. 320-321.
Sakamoto, et al. "Platform for Web Services using Proxy Server"; Research Report from Information Processing Society, Mar. 22, 2002, vol. 2002, No. 31.
Shim (computing), Wikipedia, https://en.wikipedia.org/w/index.php?title+Shim_(computing)&oldid+654971528, [retrieved on May 26, 2016], 2 pages.
Stack Overflow, Creating a database connection pool, 2009, 4 pages.
Tan et al., Provisioning for large scale cloud computing services, Jun. 2012, 2 pages.
Vaghani, S.B., Virtual Machine File System, ACM SIGOPS Operating Systems Review 44(4):57-70, Dec. 2010.
Vaquero, L., et al., Dynamically Scaling Applications in the cloud, ACM SIGCOMM Computer Communication Review 41(1):45-52, Jan. 2011.
Wang et al., "Improving utilization through dynamic VM resource allocation in hybrid cloud environment", Parallel and Distributed V Systems (ICPADS), IEEE, 2014. Retrieved on Feb. 14, 2019, Retrieved from the internet: URL<https://ieeexplore.ieee.org/stamp/stamp.jsp?tp=&arnumber=7097814, 8 pages.
Wikipedia "API" pages from date Apr. 7, 2015, retrieved using the WayBackMachine from https://web.archive.org/web/20150407191158/https://en.wikipedia.org/wiki/Application_programming_interface.
Wikipedia List_of_HTTP status_codes web page, retrieved from https://en.wikipedia.org/wiki/List_of_HTTP status_codes, 2019.
Wikipedia Recursion web page from date Mar. 26, 2015, retrieved using the WayBackMachine, from https://web.archive.org/web/20150326230100/https://en.wikipedia.org/wiki/Recursion_(computer_science), 2015.
Wikipedia subroutine web page, retrieved from https://en.wikipedia.org/wiki/Subroutine, 2019.
Wu et al., HC-Midware: A Middleware to Enable High Performance Communication System Simulation in Heterogeneous Cloud, Association for Computing Machinery, Oct. 20-22, 2017, 10 pages.
Yamasaki et al. "Model-based resource selection for efficient virtual cluster deployment", Virtualization Technology in Distributed Computing, ACM, Nov. 2007, pp. 1-7.
Yue et al., AC 2012-4107: Using Amazon EC2 in Computer and Network Security Lab Exercises: Design, Results, and Analysis, 2012, American Society for Engineering Education 2012.
Zheng, C., and D. Thain, Integrating Containers into Workflows: A Case Study Using Makeflow, Work Queue, and Docker, VTDC '15, Jun. 15, 2015, Portland, Oregon, pp. 31-38.
International Search Report and Written Opinion in PCT/US2015/052810 dated Dec. 17, 2015.
International Preliminary Report on Patentability in PCT/US2015/052810 dated Apr. 4, 2017.
Extended Search Report in European Application No. 15846932.0 dated May 3, 2018.
International Search Report and Written Opinion in PCT/US2015/052838 dated Dec. 18, 2015.
International Preliminary Report on Patentability in PCT/US2015/052838 dated Apr. 4, 2017.
Extended Search Report in European Application No. 15847202.7 dated Sep. 9, 2018.
International Search Report and Written Opinion in PCT/US2015/052833 dated Jan. 13, 2016.
International Preliminary Report on Patentability in PCT/US2015/052833 dated Apr. 4, 2017.
Extended Search Report in European Application No. 15846542.7 dated Aug. 27, 2018.
International Search Report and Written Opinion in PCT/US2015/064071 dated Mar. 16, 2016.
International Preliminary Report on Patentability in PCT/US2015/064071 dated Jun. 6, 2017.
International Search Report and Written Opinion in PCT/US2016/016211 dated Apr. 13, 2016.
International Preliminary Report on Patentability in PCT/US2016/016211 dated Aug. 17, 2017.
International Search Report and Written Opinion in PCT/US2016/026514 dated Jun. 8, 2016.
International Preliminary Report on Patentability in PCT/US2016/026514 dated Oct. 10, 2017.
International Search Report and Written Opinion in PCT/US2016/026520 dated Jul. 5, 2016.
International Preliminary Report on Patentability in PCT/US2016/026520 dated Oct. 10, 2017.
International Search Report and Written Opinion in PCT/US2016/054774 dated Dec. 16, 2016.
International Preliminary Report on Patentability in PCT/US2016/054774 dated Apr. 3, 2018.
International Search Report and Written Opinion in PCT/US2016/066997 dated Mar. 20, 2017.
International Preliminary Report on Patentability in PCT/US2016/066997 dated Jun. 26, 2018.
International Search Report and Written Opinion in PCT/US/2017/023564 dated Jun. 6, 2017.
International Preliminary Report on Patentability in PCT/US/2017/023564 dated Oct. 2, 2018.
International Search Report and Written Opinion in PCT/US2017/040054 dated Sep. 21, 2017.
International Preliminary Report on Patentability in PCT/US2017/040054 dated Jan. 1, 2019.
International Search Report and Written Opinion in PCT/US2017/039514 dated Oct. 10, 2017.

(56) References Cited

OTHER PUBLICATIONS

International Preliminary Report on Patentability in PCT/US2017/039514 dated Jan. 1, 2019.
Extended European Search Report in application No. 17776325.7 dated Oct. 23, 2019.
Office Action in European Application No. 17743108.7 dated Jan. 14, 2020.
Tange, "GNU Parallel: The Command-Line Power Tool", vol. 36, No. 1, Jan. 1, 1942, pp. 42-47.
Extended Search Report in European Application No. 19199402.9 dated Mar. 6, 2020.

* cited by examiner

PERFORMANCE-BASED HARDWARE EMULATION IN AN ON-DEMAND NETWORK CODE EXECUTION SYSTEM

BACKGROUND

Computing devices can utilize communication networks to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, hosted computing environments or data processing centers, generally referred to herein as "data centers," may include a number of interconnected computing systems to provide computing resources to users of the data center. The data centers may be private data centers operated on behalf of an organization, or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computing resources from a data center, such as single computing devices or a configuration of networked computing devices, and be provided with varying numbers of virtual machine resources.

In some scenarios, a user can request that a data center provide computing resources to execute a particular task. The task may correspond to a set of computer-executable instructions, which the data center may then execute on behalf of the user. The data center may thus further facilitate increased utilization of data center resources.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
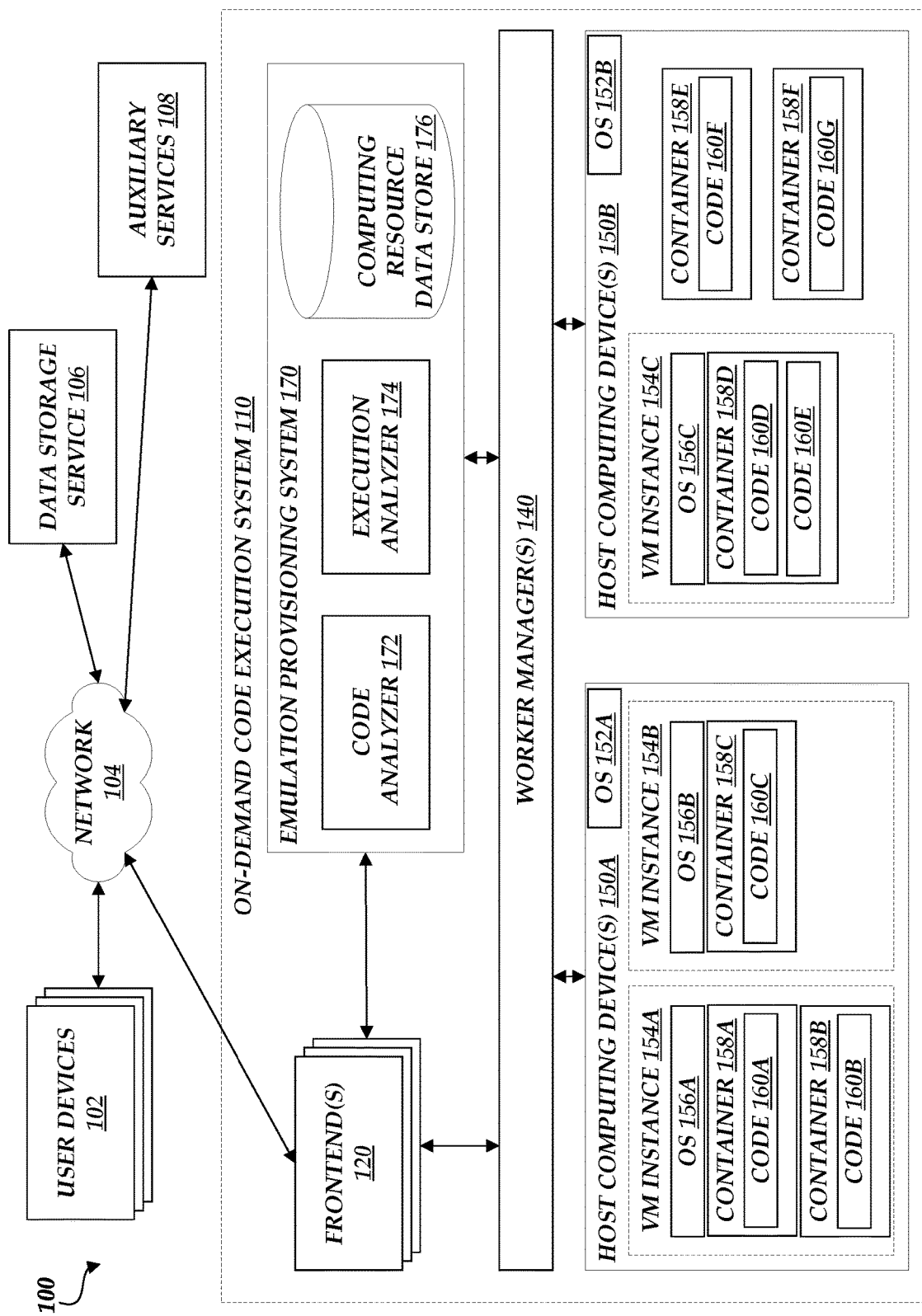
FIG. 1 is a block diagram depicting an illustrative environment in which an on-demand code execution system can execute tasks corresponding to code, which may be submitted by users of the on-demand code execution system, and can determine which computing resources to use to facilitate execution of the submitted code.

Generally described, aspects of the present disclosure relate to an on-demand code execution system. The on-demand code execution system enables rapid execution of code, which may be supplied by users of the on-demand code execution system. More specifically, embodiments of the present disclosure relate to improving the performance of an on-demand code execution system that is implemented using various computing resources. As described in detail herein, the on-demand code execution system may provide a network-accessible service enabling users to submit or designate computer-executable code to be executed by virtual machine instances on the on-demand code execution system. Each set of code on the on-demand code execution system may define a "task," and implement specific functionality corresponding to that task when executed on a virtual machine instance of the on-demand code execution system. Individual implementations of the task on the on-demand code execution system may be referred to as an "execution" of the task (or a "task execution"). The on-demand code execution system can further enable users to trigger execution of a task based on a variety of potential events, such as detecting new data at a network-based storage system, transmission of an application programming interface ("API") call to the on-demand code execution system, or transmission of a specially formatted hypertext transport protocol ("HTTP") packet to the on-demand code execution system. Thus, users may utilize the on-demand code execution system to execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds [ms]), thus enabling execution of tasks in "real-time" (e.g., with little or no perceptible delay to an end user).

The on-demand code execution system may instantiate virtual machine instances to execute the specified tasks on demand. The virtual machine instances may be provisioned with virtual processors or other computing resources, which provide functionality that the user-specified executable code may require during execution. For example, a virtual machine instance may be provisioned with a processor that facilitates or accelerates operations that are frequently used by neural networks. The processor may implement, for example, a particular instruction set (or an extension to an instruction set) that relates to these operations. In some embodiments, the instruction set may also be implemented by the underlying hardware processor of the physical computing device on which the virtual machine instance is instantiated. In other embodiments, the virtual machine instance may emulate a processor that implements a particular instruction set, and the virtual machine instance may be instantiated using a physical processor that does not implement the instruction set. The virtual machine instance may thus translate instructions implemented by the virtual processor into instructions that are implemented by the physical processor, with varying effects on performance or efficiency.

The on-demand code execution system may utilize a pool of computing resources to execute user-submitted code. The pool may include resources that vary in terms of functionality, and the demand for resources that implement particular functionality may exceed the available supply of those resources. For example, several user-submitted tasks may require or prefer a processor that implements a particular instruction set, but only a limited number of these processors may be available. In some embodiments, excess demand for resources that implement particular functionality may be met with resources that emulate the functionality. For example, a virtual machine instance may be instantiated that emulates the processor, as discussed above, and the on-demand code execution system may assign user-submitted tasks to the physical and virtual resources based on factors such as relative performance. For example, a first user-submitted task may be able to execute with acceptable performance on an emulated processor, while a second user-submitted task may execute very slowly or not at all. The on-demand code execution system may thus prioritize the allocation of scarce resources based on assessments of whether the functionality is required or merely desirable in order to execute a particular task, and may further prioritize based on the relative performance of different tasks, such that the tasks that benefit the most from the functionality receive it.

In some embodiments, a virtual machine instance instantiated on a fast physical processor may outperform a virtual or physical computing device that uses a slower processor, even if the slower processor provides functionality that the faster processor does not. For example, an older processor with a particular instruction set may be emulated in a virtual machine instance that is instantiated on a newer processor without the instruction set, and the performance gain realized by executing on the newer processor may more than offset the performance overhead associated with emulated the processor or instruction set. It will thus be understood that the on-demand code execution system is not limited to physical processors when determining a recommended set of computing resources, and that virtual emulation of a physical processor may provide superior performance.

As will be appreciated by one of skill in the art in light of the present disclosure, the embodiments disclosed herein improves the ability of computing systems, such as on-demand code execution systems, to execute code in an efficient manner. Moreover, the presently disclosed embodiments address technical problems inherent within computing systems; specifically, the limited nature of computing resources with which to execute code, the resource overhead associated with provisioning virtual machines to facilitate code execution, and the inefficiencies caused by provisioning functionality that is not utilized (or not provisioning functionality that would be utilized if available). These technical problems are addressed by the various technical solutions described herein, including the provisioning of an execution environment based on the functionality required by the code to be executed. Thus, the present disclosure represents an improvement on existing data processing systems and computing systems in general.

The on-demand code execution system may include a virtual machine instance manager configured to receive user code (threads, programs, etc., composed in any of a variety of programming languages) and execute the code in a highly scalable, low latency manner, without requiring user configuration of a virtual machine instance. Specifically, the virtual machine instance manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the virtual machine instance manager receives user-initiated requests to execute code, and identifies a pre-configured virtual machine instance to execute the code based on configuration information associated with the request. The virtual machine instance manager can further allocate the identified virtual machine instance to execute the user's code at least partly by creating and configuring containers inside the allocated virtual machine instance, and provisioning the containers with code of the task as well as an dependency code objects. Various embodiments for implementing a virtual machine instance manager and executing user code on virtual machine instances is described in more detail in U.S. Pat. No. 9,323,556, entitled "PROGRAMMATIC EVENT DETECTION AND MESSAGE GENERATION FOR REQUESTS TO EXECUTE PROGRAM CODE," and filed Sep. 30, 2014 (the "'556 Patent"), the entirety of which is hereby incorporated by reference.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used as well.

While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance.

Although example embodiments are described herein with regard to processor instruction sets, it will be understood that the present disclosure is not limited to any particular computing resource or functionality. For example, code may be analyzed to determine that it spends a significant amount of time waiting for a storage device to read or write information, and a determination may be made to provide a higher-speed data store (e.g., a memory cache or solid state device) to facilitate more efficient execution of the code. As a further example, code or performance metrics may be analyzed to determine that providing a particular graphics processing unit ("GPU") would facilitate execution of the user-submitted task, and the identified GPU may be provided or emulated. As a still further example, code may be analyzed to determine that it is optimized for a particular type of memory, such as non-volatile random access memory ("NVRAM") or dynamic random access memory ("DRAM"), and the particular type of memory may be supplied. The example embodiments are thus understood to be illustrative and not limiting.

In some embodiments, a user may submit code that requires particular functionality, or code that runs more efficiently if certain functionality is provided, without being aware of the dependency. For example, the user-submitted code may make use of a third-party library, and the library may require the functionality or make extensive use of it if available. In other embodiments, the user may be aware that particular functionality is needed, but may not know whether the on-demand code execution system provides the functionality or if so whether the functionality is currently available. By implementing the embodiments described herein, the on-demand code execution system addresses these issues and allows the user to submit code without identifying the functionality it requires, and without having to specifically request that the on-demand code execution system provide the functionality.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

FIG. 1 is a block diagram of an illustrative operating environment 100 in which an on-demand code execution system 110 may operate based on communication with user computing devices 102, auxiliary services 106, and network-based data storage services 108. In general, the user computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The on-demand code execution system 110 may provide the user computing devices 102 with one or more user interfaces, command-line interfaces (CLIs), application programing interfaces (APIs), and/or other programmatic interfaces for generating and uploading user-executable code (e.g., including metadata identifying dependency code objects for the uploaded code), invoking the user-provided code (e.g., submitting a request to execute the user codes on the on-demand code execution system 110), scheduling event-based jobs or timed jobs, tracking the user-provided code, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The illustrative environment 100 further includes one or more network-based data storage services 108, configured to enable the on-demand code execution system 110 to store and retrieve data from one or more persistent or substantially persistent data sources. Illustratively, the network-based data storage services 108 may enable the on-demand code execution system 110 to store information corresponding to a task, such as code or metadata, to store additional code objects representing dependencies of tasks, to retrieve data to be processed during execution of a task, and to store information (e.g., results) regarding that execution. The network-based data storage services 108 may represent, for example, a relational or non-relational database. In another example, the network-based data storage services 108 may represent a network-attached storage (NAS), configured to provide access to data arranged as a file system. The network-based data storage services 108 may further enable the on-demand code execution system 110 to query for and retrieve information regarding data stored within the on-demand code execution system 110, such as by querying for a number of relevant files or records, sizes of those files or records, file or record names, file or record creation times, etc. In some instances, the network-based data storage services 108 may provide additional functionality, such as the ability to separate data into logical groups (e.g., groups associated with individual accounts, etc.). While shown as distinct from the auxiliary services 106, the network-based data storage services 108 may in some instances also represent a type of auxiliary service 106.

The user computing devices 102, auxiliary services 106, and network-based data storage services 108 may communicate with the on-demand code execution system 110 via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The on-demand code execution system 110 is depicted in FIG. 1 as operating in a distributed computing environment including several computer systems that are interconnected using one or more computer networks (not shown in FIG. 1). The on-demand code execution system 110 could also operate within a computing environment having a fewer or greater number of devices than are illustrated in FIG. 1. Thus, the depiction of the on-demand code execution system 110 in FIG. 1 should be taken as illustrative and not limiting to the present disclosure. For example, the on-demand code execution system 110 or various constituents thereof could implement various Web services components, hosted or "cloud" computing environments, and/or peer to peer network configurations to implement at least a portion of the processes described herein.

Further, the on-demand code execution system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the on-demand code execution system 110 is illustrated as connected to the network 104. In some embodiments, any of the components within the on-demand code execution system 110 can communicate with other components of the on-demand code execution system 110 via the network 104. In other embodiments, not all components of the on-demand code execution system 110 are capable of communicating with other components of the virtual environment 100. In one example, only the frontend 120 (which may in some instances represent multiple frontends 120) may be connected to the network 104, and other components of the on-demand code execution system 110 may communicate with other components of the environment 100 via the frontends 120.

In FIG. 1, users, by way of user computing devices 102, may interact with the on-demand code execution system 110 to provide executable code, and establish rules or logic defining when and how such code should be executed on the on-demand code execution system 110, thus establishing a "task." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution system 110, and request that the on-demand code execution system 110 execute the code. The on-demand code execution system 110 can handle the acquisition and configuration of compute capacity (e.g., containers, instances, etc., which are described in greater detail below) based on the code execution request, and execute the code using the compute capacity. The on-demand code execution system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying). In accordance with embodiments of the present disclosure, and as described in more detail below, the on-demand code execution system 110 may configure the virtual machine instances with customized operating systems to execute the user's code more efficiency and reduce utilization of computing resources.

To enable interaction with the on-demand code execution system 110, the system 110 includes one or more frontends 120, which enable interaction with the on-demand code execution system 110. In an illustrative embodiment, the frontends 120 serve as a "front door" to the other services provided by the on-demand code execution system 110, enabling users (via user computing devices 102) to provide, request execution of, and view results of computer executable code. The frontends 120 include a variety of components to enable interaction between the on-demand code execution system 110 and other computing devices. For example, each frontend 120 may include a request interface providing user computing devices 102 with the ability to upload or otherwise communication user-specified code to the on-demand code execution system 110 and to thereafter request execution of that code. In one embodiment, the request interface communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the user code specified in the request.

References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code (including, e.g., compiling code, interpreting code, or otherwise making the code executable) are referred to as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 110 in a variety of manners. In one embodiment, a user or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of an auxiliary service 106 or a storage system internal to the on-demand code execution system 110) prior to the request being received by the on-demand code execution system 110. As noted above, the code for a task may reference additional code objects maintained at the on-demand code execution system 110 by use of identifiers of those code objects, such that the code objects are combined with the code of a task in an execution environment prior to execution of the task. The on-demand code execution system 110 may vary its execution strategy for a task based on where the code of the task is available at the time a call for the task is processed. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface 122.

A call to execute a task may specify one or more third-party libraries (including native libraries) to be used along with the user code corresponding to the task. In one embodiment, the call may provide to the on-demand code execution system 110 a file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the on-demand code execution system 110 (e.g., standard routines), and/or provided by third parties. Illustratively, code not included within a call or previously uploaded by the user may be referenced within metadata of the task by use of a URI associated with the code. In some embodiments, such resource-level constraints (e.g., how much memory is to be allocated for executing a particular user code) are specified for the particular task, and may not vary over each execution of the task. In such cases, the on-demand code execution system 110 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 110 to access private resources (e.g., on a private network). In some embodiments, individual code objects may also be associated with permissions or authorizations. For example, a third party may submit a code object and designate the object as readable by only a subset of users. The on-demand code execution system 110 may include functionality to enforce these permissions or authorizations with respect to code objects.

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the on-demand code execution system 110 may inspect the call and look for the flag or the header, and if it is present, the on-demand code execution system 110 may modify the behavior (e.g., logging facilities) of the container in which the task is executed, and cause the output data to be provided back to the user. In some embodiments, the behavior/mode indicators are added to the call by the user interface provided to the user by the on-demand code execution system 110. Other features such as source code profiling, remote debugging, etc. may also be enabled or disabled based on the indication provided in a call.

To manage requests for code execution, the frontend 120 can include an execution queue (not shown in FIG. 1), which can maintain a record of requested task executions. Illustratively, the number of simultaneous task executions by the on-demand code execution system 110 is limited, and as such, new task executions initiated at the on-demand code execution system 110 (e.g., via an API call, via a call from an executed or executing task, etc.) may be placed on the execution queue 124 and processed, e.g., in a first-in-first-out order. In some embodiments, the on-demand code execution system 110 may include multiple execution queues, such as individual execution queues for each user account. For example, users of the on-demand code execution system 110 may desire to limit the rate of task executions on the on-demand code execution system 110 (e.g., for cost reasons). Thus, the on-demand code execution system 110 may utilize an account-specific execution queue to throttle the rate of simultaneous task executions by a specific user account. In some instances, the on-demand code execution system 110 may prioritize task executions, such that task executions of specific accounts or of specified priorities bypass or are prioritized within the execution queue. In other instances, the on-demand code execution system 110 may execute tasks immediately or substantially immediately after receiving a call for that task, and thus, the execution queue may be omitted.

As noted above, tasks may be triggered for execution at the on-demand code execution system 110 based on explicit calls from user computing devices 102 (e.g., as received at the request interface). Alternatively or additionally, tasks may be triggered for execution at the on-demand code execution system 110 based on data retrieved from one or more auxiliary services 106 or network-based data storage services 108. To facilitate interaction with auxiliary services 106, the frontend 120 can include a polling interface (not shown in FIG. 1), which operates to poll auxiliary services 106 or data storage services 108 for data. Illustratively, the polling interface may periodically transmit a request to one or more user-specified auxiliary services 106 or data storage services 108 to retrieve any newly available data (e.g., social network "posts," news articles, files, records, etc.), and to determine whether that data corresponds to a user-established criteria triggering execution a task on the on-demand code execution system 110. Illustratively, criteria for execution of a task may include, but is not limited to, whether new data is available at the auxiliary services 106 or data storage services 108, the type or content of the data, or timing information corresponding to the data. In some instances, the auxiliary services 106 or data storage services 108 may function to notify the frontend 120 of the availability of new data, and thus the polling service may be unnecessary with respect to such services.

In addition to tasks executed based on explicit user calls and data from auxiliary services 106, the on-demand code execution system 110 may in some instances operate to trigger execution of tasks independently. For example, the on-demand code execution system 110 may operate (based on instructions from a user) to trigger execution of a task at each of a number of specified time intervals (e.g., every 10 minutes).

The frontend 120 can further include an output interface (not shown in FIG. 1) configured to output information regarding the execution of tasks on the on-demand code execution system 110. Illustratively, the output interface may transmit data regarding task executions (e.g., results of a task, errors related to the task execution, or details of the task execution, such as total time required to complete the execution, total data processed via the execution, etc.) to the user computing devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

In some embodiments, the on-demand code execution system 110 may include multiple frontends 120. In such embodiments, a load balancer (not shown in FIG. 1) may be provided to distribute the incoming calls to the multiple frontends 120, for example, in a round-robin fashion. In some embodiments, the manner in which the load balancer distributes incoming calls to the multiple frontends 120 may be based on the location or state of other components of the on-demand code execution system 110. For example, a load balancer may distribute calls to a geographically nearby frontend 120, or to a frontend with capacity to service the call. In instances where each frontend 120 corresponds to an individual instance of another component of the on-demand code execution system, such as the active pool 140A described below, the load balancer may distribute calls according to the capacities or loads on those other components. As will be described in more detail below, calls may in some instances be distributed between frontends 120 deterministically, such that a given call to execute a task will always (or almost always) be routed to the same frontend 120. This may, for example, assist in maintaining an accurate execution record for a task, to ensure that the task executes only a desired number of times. While distribution of calls via a load balancer is illustratively described, other distribution techniques, such as anycast routing, will be apparent to those of skill in the art.

To execute tasks, the on-demand code execution system 110 includes one or more worker managers 140 that manage the instances used for servicing incoming calls to execute tasks. In the example illustrated in FIG. 1, each worker manager 140 manages an active pool of virtual machine instances 154A-C, which are currently assigned to one or more users and are implemented by one or more physical host computing devices 150A-B. The physical host computing devices 150A-B and the virtual machine instances 154A-C may further implement one or more containers 158A-F, which may contain and execute one or more user-submitted codes 160A-G. Containers are logical units created within a virtual machine instance, or on a host computing device, using the resources available on that instance or device. For example, each worker manager 140 may, based on information specified in a call to execute a task, create a new container or locate an existing container 158A-F and assign the container to handle the execution of the task.

The containers 156A-F, virtual machine instances 154A-C, and host computing devices 150A-B may further include language runtimes, code libraries, or other supporting functions (not depicted in FIG. 1) that facilitate execution of user-submitted code 160A-G. The physical computing devices 150A-B and the virtual machine instances 154A-C may further include operating systems 152A-B and 156A-C. In various embodiments, operating systems 152A-B and 156A-C may be the same operating system, variants of the same operating system, different operating systems, or combinations thereof.

Although the virtual machine instances 154A-C are described here as being assigned to a particular user, in some embodiments, an instance 154A-C may be assigned to a group of users, such that the instance is tied to the group of users and any member of the group can utilize resources on the instance. For example, the users in the same group may belong to the same security group (e.g., based on their security credentials) such that executing one member's task in a container on a particular instance after another member's task has been executed in another container on the same instance does not pose security risks. Similarly, the worker managers 140 may assign the instances and the containers according to one or more policies that dictate which requests can be executed in which containers and which instances can be assigned to which users. An example policy may specify that instances are assigned to collections of users who share the same account (e.g., account for accessing the services provided by the on-demand code execution system 110). In some embodiments, the requests associated with the same user group may share the same containers (e.g., if the user codes associated therewith are identical). In some embodiments, a task does not differentiate between the different users of the group and simply indicates the group to which the users associated with the task belong.

Once a triggering event to execute a task has been successfully processed by a frontend 120, the frontend 120 passes a request to a worker manager 140 to execute the task. In one embodiment, each frontend 120 may be associated with a corresponding worker manager 140 (e.g., a worker manager 140 co-located or geographically nearby to the frontend 120) and thus the frontend 120 may pass most or all requests to that worker manager 140. In another embodiment, a frontend 120 may include a location selector configured to determine a worker manager 140 to which to pass the execution request. In one embodiment, the location selector may determine the worker manager 140 to receive a call based on hashing the call, and distributing the call to a worker manager 140 selected based on the hashed value (e.g., via a hash ring). Various other mechanisms for distributing calls between worker managers 140 will be apparent to one of skill in the art. In accordance with embodiments of the present disclosure, the worker manager 140 can determine a host computing device 150A-B or a virtual machine instance 154A-C for executing a task in accordance with a recommendation from an emulation provisioning system 170.

The on-demand code execution system 110 further includes an emulation provisioning system 170, which implements aspects of the present disclosure including, for example, the determination of how to provide functionality that may be required for a particular task. In some embodiments, the emulation provisioning system 170 includes a code analyzer 162, which may be invoked when the user submits code via the frontend 120 to statically analyze submitted code and determine functionality that is required by the submitted code. As described in more detail below, the code analyzer 162 may analyze the user's code and identify, for example, API calls, operating system calls, function calls, or other indications of functionality that the code will require during execution. In various embodiments, the code analyzer 162 may analyze keywords, symbols, headers, directives, or other aspects of the user's code. In further embodiments, the on-demand code execution system 110 includes an execution analyzer 164, which may be invoked when the user's code is executed to analyze the performance of the executing code and the functionality that is actually utilized during execution of the code. The execution analyzer 164 may identify, for example, a portion of the source code that requires specific functionality, but is seldom or never reached during execution. In further embodiments, the emulation provisioning system 170 may include a computing resource data store 176, which may store information regarding the functionality that is provided by various host computing devices 150A-B or is emulated by various virtual machine instances 154A-C.

As shown in FIG. 1, various combinations and configurations of host computing devices 150A-B, virtual machine instances 154A-C, and containers 158A-F may be used to facilitate execution of user submitted code 160A-G. In the illustrated example, the host computing device 150A implements two virtual machine instances 154A and 154B. Virtual machine instance 154A, in turn, implements two containers 158A and 158B, which contain user-submitted code 160A and 160B respectively. Virtual machine instance 154B implements a single container 158C, which contains user-submitted code 160C. The host computing device 150B further implements a virtual machine instance 154C and directly implements containers 158E and 158F, which contain user-submitted code 160F and 160G. The virtual machine instance 154C, in turn, implements container 158D, which contains user-submitted codes 160D and 160E. It will be understood that these embodiments are illustrated for purposes of example, and that many other embodiments are within the scope of the present disclosure.

While some functionalities are generally described herein with reference to an individual component of the on-demand code execution system 110, other components or a combination of components may additionally or alternatively implement such functionalities. For example, a worker manager 140 may operate to provide functionality associated with execution of user-submitted code as described herein with reference to an emulation provisioning system 170.

Figure 2:
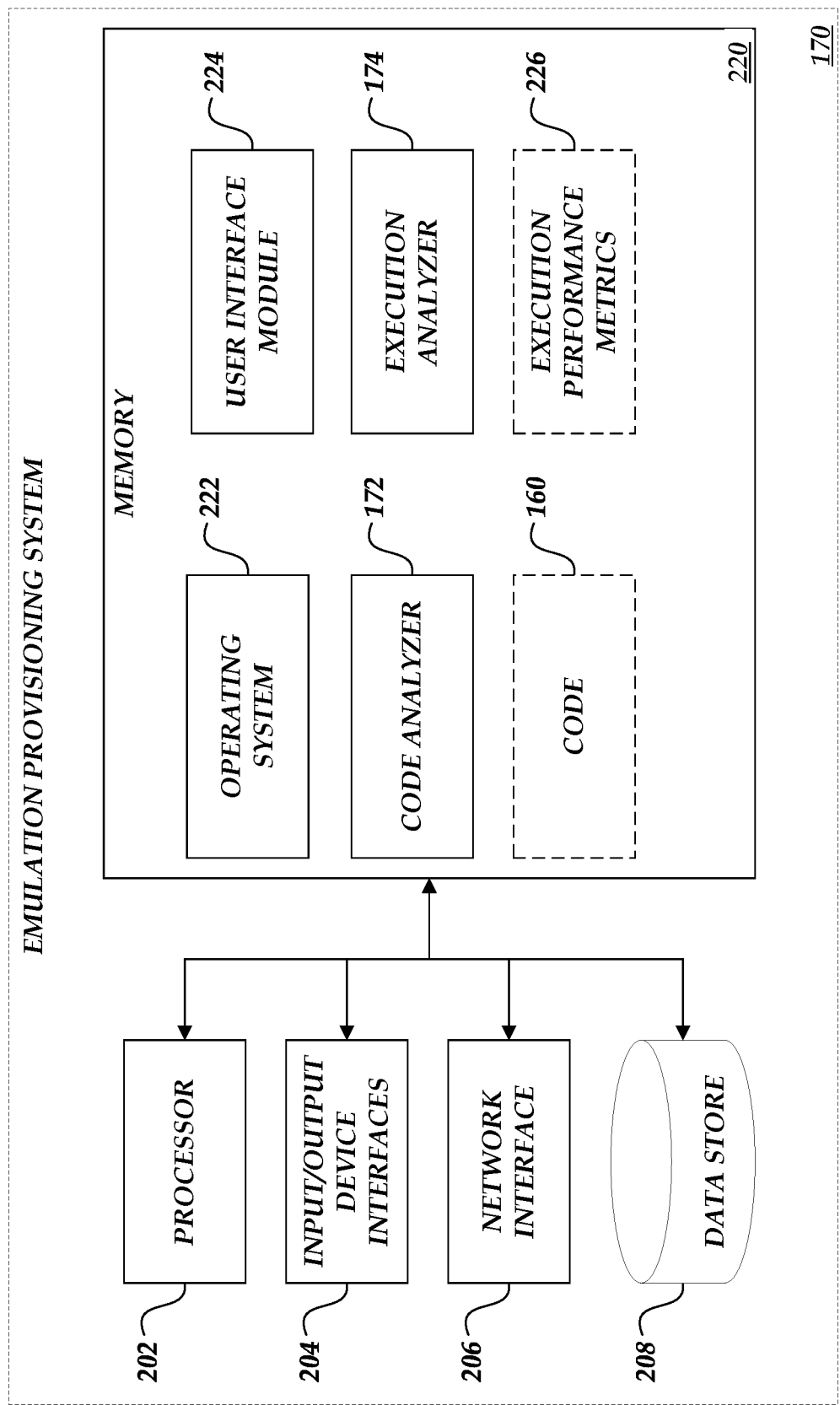
FIG. 2 depicts a general architecture of a computing device providing an emulation performance analysis system that is configured to determine the computing resources used to facilitate execution of tasks on the on-demand code execution system of FIG. 1.

FIG. 2 depicts a general architecture of a computing system (referenced as emulation provisioning system 170) that operates to determine how functionality used by a particular task should be provided within the on-demand code execution system 110. The general architecture of the emulation provisioning system 170 depicted in FIG. 2 includes an arrangement of computer hardware and software modules that may be used to implement aspects of the present disclosure. The hardware modules may be implemented with physical electronic devices, as discussed in greater detail below. The emulation provisioning system 170 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the emulation provisioning system 170 includes a processor 202, input/output device interfaces 204, a network interface 206, and a data store 208, all of which may communicate with one another by way of a communication bus. The network interface 292 may provide connectivity to one or more networks or computing systems. The processor 202 may thus receive information and instructions from other computing systems or services via the network 104. The processor 202 may also communicate to and from a memory 280 and further provide output information for an optional display (not shown) via the input/output device interfaces 204. The input/output device interfaces 296 may also accept input from an optional input device (not shown).

The memory 220 may contain computer program instructions (grouped as modules in some embodiments) that the processor 202 executes in order to implement one or more aspects of the present disclosure. The memory 220 generally includes random access memory (RAM), read only memory (ROM) and/or other persistent, auxiliary or non-transitory computer readable media. The memory 220 may store an operating system 222 that provides computer program instructions for use by the processor 202 in the general administration and operation of the emulation provisioning system 170. The memory 220 may further include computer program instructions and other information for implementing aspects of the present disclosure. For example, in one embodiment, the memory 220 includes a user interface module 224 that generates user interfaces (and/or instructions therefor) for display upon a computing device, e.g., via a navigation and/or browsing interface such as a browser or application installed on the computing device. In addition, the memory 220 may include and/or communicate with one or more data repositories (not shown), for example, to access user program codes and/or libraries.

In addition to and/or in combination with the user interface module 224, the memory 220 may include a code analyzer 172 and an execution analyzer 174 that may be executed by the processor 202. In one embodiment, the code analyzer 172 and the execution analyzer 174 individually or collectively implement various aspects of the present disclosure, e.g., analyzing code or code execution to determine needed functionality and provide that functionality efficiently, as described further below.

While the code analyzer 172 and the execution analyzer 174 are shown in FIG. 2 as part of the emulation provisioning system 170, in other embodiments, all or a portion of the code analyzer 172 and the execution analyzer 174 may be implemented by other components of the on-demand code execution system 110 and/or another computing device. For example, in certain embodiments of the present disclosure, another computing device in communication with the on-demand code execution system 110 may include several modules or components that operate similarly to the modules and components illustrated as part of the emulation provisioning system 170.

The memory 220 may further include user-submitted code 160, which may be loaded into memory in conjunction with a user-submitted request to execute a task on the on-demand code execution system 110. The code 160 may be illustratively analyzed by the code analyzer 172 to identify needed functionality, as described in more detail below. The memory 220 may further include execution performance metrics 226, which may be collected from physical or virtual machines as the code 160 is executed on these platforms, and may be analyzed by the execution analyzer 174.

In some embodiments, the emulation provisioning system 170 may further include components other than those illustrated in FIG. 2. For example, the memory 220 may further include computing resource information that identifies the functionality provided by various physical and virtual computing resources that are available for executing the user-submitted code 160, or may include metadata or other information that was submitted with the request, such as an indication that the user-submitted code 160 was compiled for execution on a computing resource that provided certain functionality. FIG. 2 is thus understood to be illustrative but not limiting.

Figure 3:
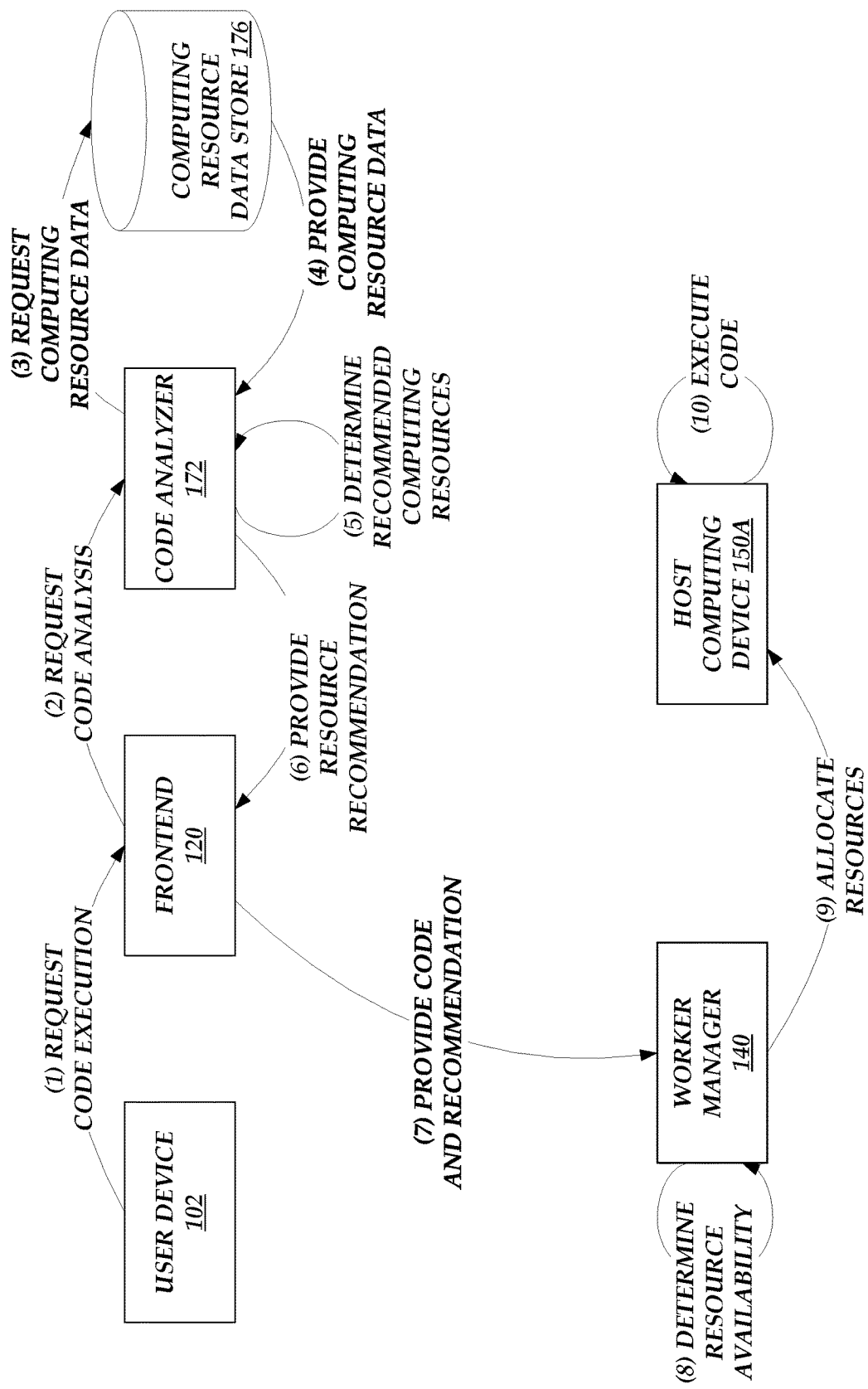
FIG. 3 is a flow diagram depicting illustrative interactions for submitting code corresponding to a task to the on-demand code execution system of FIG. 1, and for the on-demand code execution system to analyze the code and determine a set of computing resources that may be used to facilitate execution.

FIG. 3 depicts illustrative interactions for determining the computing resources to use when executing a task based on an analysis of the user-submitted code for the task. At (1), a user device 102 submits a request to execute a task to a frontend 120 of an on-demand code execution system. The request may include user-submitted code, or in some embodiments may identify user code that has been previously submitted. At (2), the frontend 120 requests that the code analyzer 172 analyze the user-submitted code to identify functionality that the code may require during execution. Illustratively, the user-submitted code may take advantage of a particular instruction set if it is available, such as an instruction set that implements vector instructions, floating point instructions, fused multiply-add instructions, neural network instructions, tensor processing instructions, single instruction multiple data ("SIMD") instructions, cryptography instructions, or the like. A physical processor may implement one or more these instruction sets. A virtual processor in a virtual machine may also implement one or more of these instruction sets, with varying performance results depending on the interactions between the virtual machine and the underlying physical computing resources.

At (3), the code analyzer 172 may request computing resource data from the computing resource data store 176. The computing resource data may indicate, for example, particular computing resources that are available within the on-demand code execution system 110 for executing the user-submitted code, and may further indicate the functionality associated with these computing resources, the performance of these computing resources when providing specified functionality, and other parameters or information that enable the code analyzer 172 to determine recommended computing resources. At (4), the computing resource data store 176 may provide the requested computing resource data. In some embodiments, the computing resource data store 176 may only provide data regarding available computing resources. In other embodiments, the computing resource data store 176 may provide data regarding computing resources that are unavailable (e.g., because they are currently being used to execute other user-submitted code), and the code analyzer 172 may determine whether to make these resources available by, for example, migrating other tasks.

At (5), the code analyzer 172 may determine a set of computing resources to use when executing the user-submitted code. In some embodiments, the code analyzer 172 may generate a recommendation that the worker manager 140 may optionally implement, depending on resource availability, prioritization of requested tasks, and other factors. In other embodiments, the code analyzer 172 may consider some or all of these factors when making its determination, and may determine a set of computing resources for the worker manager 140 to allocate. The code analyzer 172 may analyze instructions, operations, functions, API calls, libraries, or other aspects of the user-submitted code to identify functionality that the code may use, and may identify computing resources that provide this functionality. For example, the code analyzer 172 may analyze the user-submitted code and identify that it has been compiled for execution on a particular processor (e.g., by setting particular flags at compile time), or that it includes a library that makes frequent use of floating point arithmetic. In some embodiments, the code analyzer 172 may obtain information regarding previous executions of the user-submitted code and determine the functionality used by the code on that basis. In further embodiments, the code analyzer 172 may obtain information regarding other code submitted by the same user, and may assess whether the user's submissions frequently make use of particular functionality. The code analyzer 172 may further analyze data such as user priorities or preferences, and may analyze computing resource data to consider factors such as limited availability of particular resources (which may be expressed as a resource cost), overall demand for certain computing resources, prioritization of requests and tasks, or other considerations.

At (6), the code analyzer 172 provides the resource recommendation to the frontend 120, and at (7) the frontend 120 provides the resource recommendation and the user-submitted code to the worker manager 140. In some embodiments, the interaction at (6) may be omitted and the code analyzer 172 may provide a resource recommendation directly to the worker manager 140. In further embodiments, the interactions at (6) and (7) may be combined and the code analyzer 172 may provide both the user-submitted code and the recommendation to the worker manager 140. In still further embodiments, the worker manager 140 may carry out the interaction at (2) and request a resource recommendation from the code analyzer 172. In various embodiments, the frontend 120 or the code analyzer 172 may provide an identifier or other information that allows the worker manager 140 to obtain the user-submitted code rather than providing the user-submitted code directly.

At (8), in some embodiments, the worker manager 140 may determine the availability of resources that were recommended by the code analyzer 172. In some embodiments, the code analyzer 172 may provide a prioritized or ordered list of potential computing resources for executing the user-submitted code, and the worker manager 140 may determine a "best available" resource by comparing the prioritized list to the available resource pool. The other embodiments, the code analyzer 172 may provide scores or weighting factors for various potential computing resources (or for the relative priority of the task), and the worker manager 140 may determine a computing resource based on these factors. In further embodiments, as described above, the code analyzer 172 may consider resource availability when determining a set of computing resources, and the interaction at (8) may be omitted or may be a determination that tasks must be migrated from one resource to another to free up the resources that will be used to execute the newly submitted task.

At (9), the worker manager 140 may allocate the computing resources that will be used to execute the user-submitted code. In various embodiments, allocating the computing resources may include allocating a host computing device 150A, allocating an existing virtual machine instance (not shown in FIG. 3), instantiating a new virtual machine instance (not shown in FIG. 3), or combinations thereof. In some embodiments, as described above, the worker manager 140 may allocate computing resources other than those recommended by the code analyzer 142. For example, if the computing resources recommended by the code analyzer 142 are not available, then the worker manager 140 may determine alternate resources based on the recommendation or on resource availability. At (10), the host computing device 150A or other allocated computing resource executes the user-submitted code.

In some embodiments, the ordering and implementation of operations described above may be modified, or these interactions may be carried out by additional or alternative elements of the on-demand code execution system 110. For example, in some embodiments, the worker manager 140 may be configured to analyze performance metrics and request a resource recommendation from the execution analyzer 174 in response to the metrics satisfying certain criteria. As a further example, code analysis may be carried out prior to receiving a request to execute user-submitted code, and the results of such analysis may be stored (e.g., in the computing resource data store 176) for later use when code execution is requested.

Figure 4:
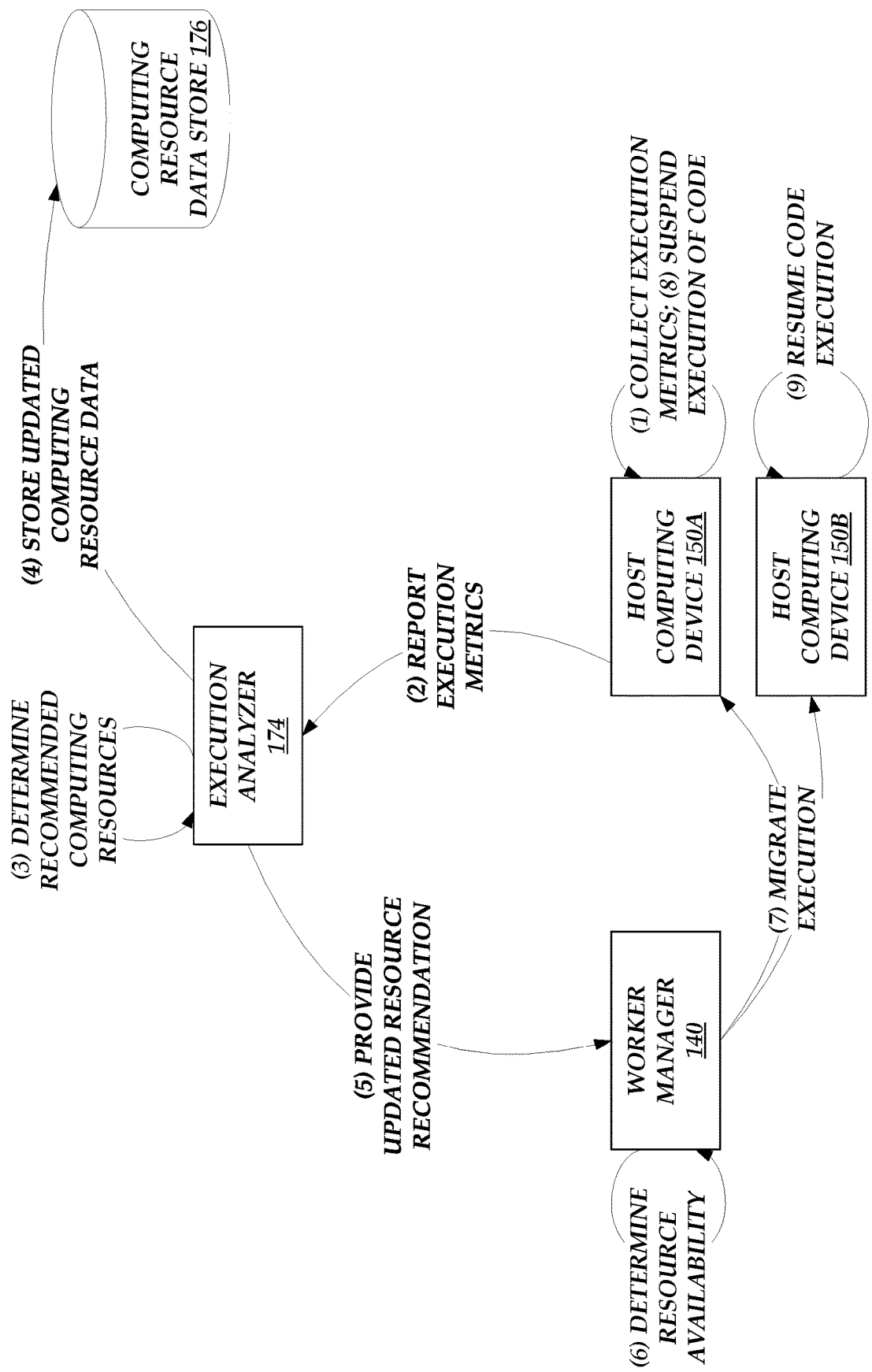
FIG. 4 is a flow diagram depicting illustrative interactions for the on-demand code execution system of FIG. 1 to analyze performance metrics associated with the execution of code using a particular set of computing resources, determine whether an alternate set of computing resources is available and would be preferable, and if so migrate the code execution to the alternate set of computing resources.

FIG. 4 depicts illustrative interactions for determining the computing resources to use when executing a task based on an analysis of a current or previous execution of the task. At (1), a computing resource that is executing the task, such as a host computing device 150A or a virtual machine instance executing on the host computing device 150A, collects performance metrics regarding the execution of the task. Performance metrics may include, for example, the number of processor instructions executed per clock cycle, which may provide an indication of how efficiently a virtual machine instance is emulating a processor that is not physically provided. In various embodiments, performance metrics may include measurements such as total execution time, computing resources utilized (or not utilized) during execution, and the like. At (2), the computing resource reports the execution metrics to the execution analyzer 174. In various embodiments, the computing resource may report metrics during execution of the task or after its completion.

At (3), the execution analyzer 174 may determine recommended computing resources. Illustratively, the execution analyzer 174 may determine, based on the execution metrics, that a different set of computing resources could execute the code more efficiently. For example, the execution analyzer 174 may determine that the code is performing a number of operations that would execute more efficiently on a different computing resource (e.g., a processor that implements a particular instruction set). As a further example, the execution analyzer 174 may determine that the code is making little or no use of a computing resource, and thus may be migrated to a different computing resource without significant effect on performance. In some embodiments, the execution analyzer 174 may obtain information from the computing resource data store 176 regarding other computing resources that may be available for executing the code, and may estimate the performance of executing the code on those resources relative to the received performance metrics.

At (4), the execution analyzer 174 may store updated computing resource data to the computing resource data store 176. Illustratively, the execution analyzer 174 may store that a particular set of computing resources executed the code with a particular degree of efficiency (or inefficiency) based on the collected performance metrics, and this information may be used to refine subsequent analyses by the execution analyzer 174 or the code analyzer 172. In some embodiments, as discussed above, the execution analyzer 174 may store that the computing resources were underutilized, or that particular functionality was needed but absent, when executing the code. In some embodiments, the execution analyzer 174 may analyze the results of multiple executions of various user-submitted code to identify trends or patterns that may facilitate allocation of computing resources to the execution of user-submitted code.

At (5), in some embodiments, the execution analyzer 174 may provide an updated resource recommendation to the worker manager 140. In some embodiments, as discussed above, the execution analyzer 174 may consider factors such as resource availability and prioritization, and may instruct the worker manager 140 to migrate the user-submitted code to a different set of computing resources. In other embodiments, the execution analyzer 174 may provide a recommendation and the worker manager 140 may determine whether to implement the recommendation. In such embodiments, at (6), the worker manager 140 may determine whether computing resources or available, or can be made available, to implement the recommendation of the execution analyzer 174. In some embodiments, the worker manager 140 or the execution analyzer 174 may consider whether the estimated performance gain to be realized by migrating executing code to a different set of computing resources outweighs any costs associated with the migration, such as the transfer of execution states or costs associated with freeing up the resources. In further embodiments, the worker manager 140 or the execution analyzer 174 may aggregate or prioritize recommendations to ensure that resources are allocated efficiently overall.

At (7), the worker manager 140 may migrate execution of the user-submitted code from one set of computing resources to another. For example, the worker manager 140 may migrate execution of the code from a host computing device 150A to another host computing device 150B that implements different functionality. In various embodiments, the worker manager 140 may migrate the code execution from one physical computing device to another, from one virtual machine instance to another, from a physical computing device to a virtual machine instance (or vice versa), or combinations thereof. In some embodiments, the worker manager 140 may migrate the code execution by suspending execution on the host computing device 150A, migrating the code and state information to the host computing device 150B, and then resuming code execution on the host computing device 150B and releasing the resources on the host computing device 150A that were executing the code. In other embodiments, the worker manager 140 may migrate the code execution by terminating an in-progress execution on the host computing device 150A and starting over on the host computing device 150B. In further embodiments, the worker manager may perform a "live" migration, and may begin execution on the host computing device 150B without suspending execution on the host computing device 150A, or may execute on both devices 150A-B in parallel for a time before completing the migration. Other embodiments of migrating executing code will be understood to be within the scope of the disclosure. At (8), the host computing device 150A may suspend its execution of the user-submitted code, and at (9) the host computing device 150B (or other physical or virtual computing device) may resume execution of the code from the point at which execution was suspended.

In some embodiments, the execution analyzer 174 may determine a set of computing resources to be used when the user-submitted code is next executed, and may provide this recommendation to the code analyzer 172, worker manager 140, or store it in the computing resource data store 176. Additionally, in some embodiments, the execution analyzer 174 may make a determination or recommendation at the start of a subsequent execution of the code based on performance metrics collected during the previous execution(s), which may supplement or replace a code-based analysis for the subsequent executions.

In some embodiments, the reporting of execution metrics at (2) may be carried out continuously during execution of the user-submitted code, and the execution analyzer 174 may dynamically analyze whether the user-submitted code requires different computing resources at various points during its execution. For example, the execution analyzer 174 may determine that the user-submitted code has begun or ended a phase of execution that makes us of certain functionality, and may recommend making that functionality available or indicate the functionality is no longer required. Additionally, in some embodiments, the worker manager 140 may request that the execution analyzer 174 provide a recommendation for a particular computing resource (e.g., a computing resource that has become available), and may receive a recommendation to migrate execution of a particular user-submitted code to the resource.

Figure 5:
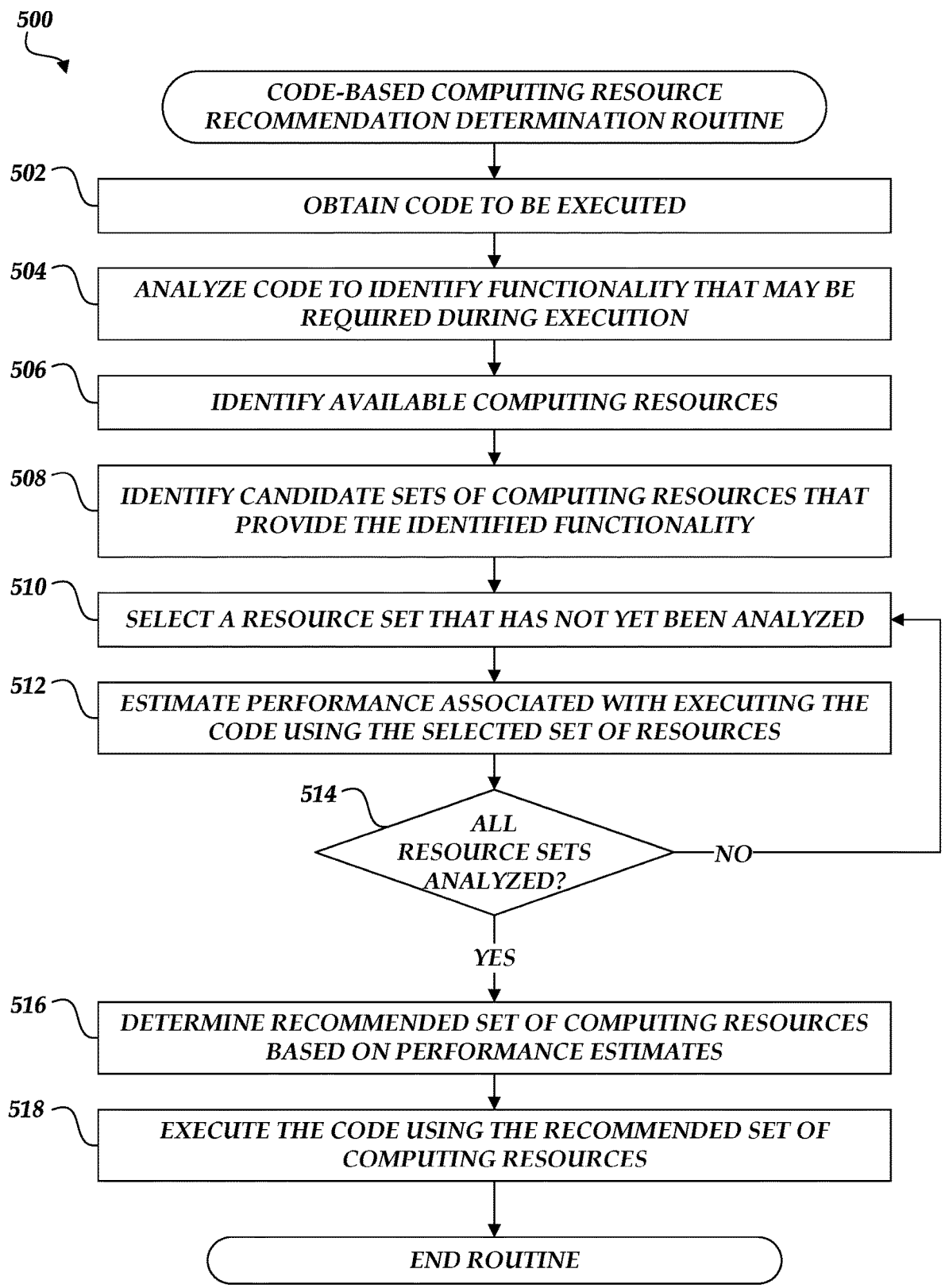
FIG. 5 is a flow chart depicting an illustrative routine for analyzing submitted code to determine a set of resources that may be used to facilitate execution of the code on the on-demand code execution system of FIG. 1.

FIG. 5 is a flow diagram of an illustrative routine 500 for determining a set of computing resources to recommend based on an analysis of user-submitted code. The routine 500 may be carried out, for example, by the code analyzer 172 of FIG. 1. The routine 500 begins at block 502, where code for a task (e.g., as submitted by a user) may be obtained. In one embodiment, the code for the task is represented as a code object, such as a compressed file including source code for the task. At block 504, the code is analyzed to identify functionality that may be required during code execution. As described above, the code may be analyzed with regard to libraries, programming language features, API calls, or other features to identify functionality that may be advantageous to provide during code execution. In some embodiments, the code may be compared to other code executed by the on-demand code execution system 110, and common features or similarities may be identified.

At block 506, available computing resources may be identified. In some embodiments, as described above, computing resources may be identified regardless of their availability. In various embodiments, availability may be considered both in terms of availability within a particular data center (e.g., the resources are present) and availability for use (e.g., the resources are idle or can be freed). At block 508, sets of computing resources that provide the identified functionality may be identified as potential candidates for executing the user-submitted code. A set of computing resources may include, for example, various physical or virtual resources such as a processor, memory, interfaces, data stores, and the like. In some embodiments, a virtual computing resource may be associated with a particular host computing environment. For example, a virtual processor may be associated with the underlying physical processor in order to assess the performance of the virtual processor when providing the required functionality.

At block 510, a set of resources that has not yet been analyzed by this execution of the routine 500 may be selected. At block 512, the performance of this set of resources may be estimated with regard to executing the user-submitted code. The performance may be estimated, for example, based on benchmarks, metrics, previous executions, or other criteria. In various embodiments, performance estimates may be expressed in terms of numerical scores, grades, categories (e.g., high, medium, and low), or other formats that enable comparison.

At decision block 514, a determination may be made as to whether all of the candidate sets of computing resources have been analyzed by the routine 500. If not, then the routine 500 branches to block 510 and iterates through blocks 512 and 514 until all sets of computing resources have been analyzed. Once all resource sets have been analyzed, the routine 500 branches to block 516, where a recommended set of computing resources may be determined based on the performance estimates. In some embodiments, the set of computing resources having the highest estimated performance may be recommended. In other embodiments, the sets of computing resources may be associated with cost, scarcity, or other criteria that may be factored into the recommendation. For example, a scarce computing resource may be allocated only if the difference in performance relative to a widely available computing resource exceeds a threshold.

At block 518, the code may be executed using the recommended set of computing resources. In some embodiments, as described above, the recommended set of computing resources may be one factor in the allocation of computing resources, and may be weighed along with other considerations such as resource availability or cost. In other embodiments, a prioritized list of candidate computing resources may be output and may be used to determine the computing resources to use when executing the code. In further embodiments, the routine 500 may determine that a particular resource should be made available, and may identify another task (and associated user-submitted code) to migrate in order to free the particular resource based on the estimated or measured performance of various tasks that are executing on the resource to be made available.

Figure 6:
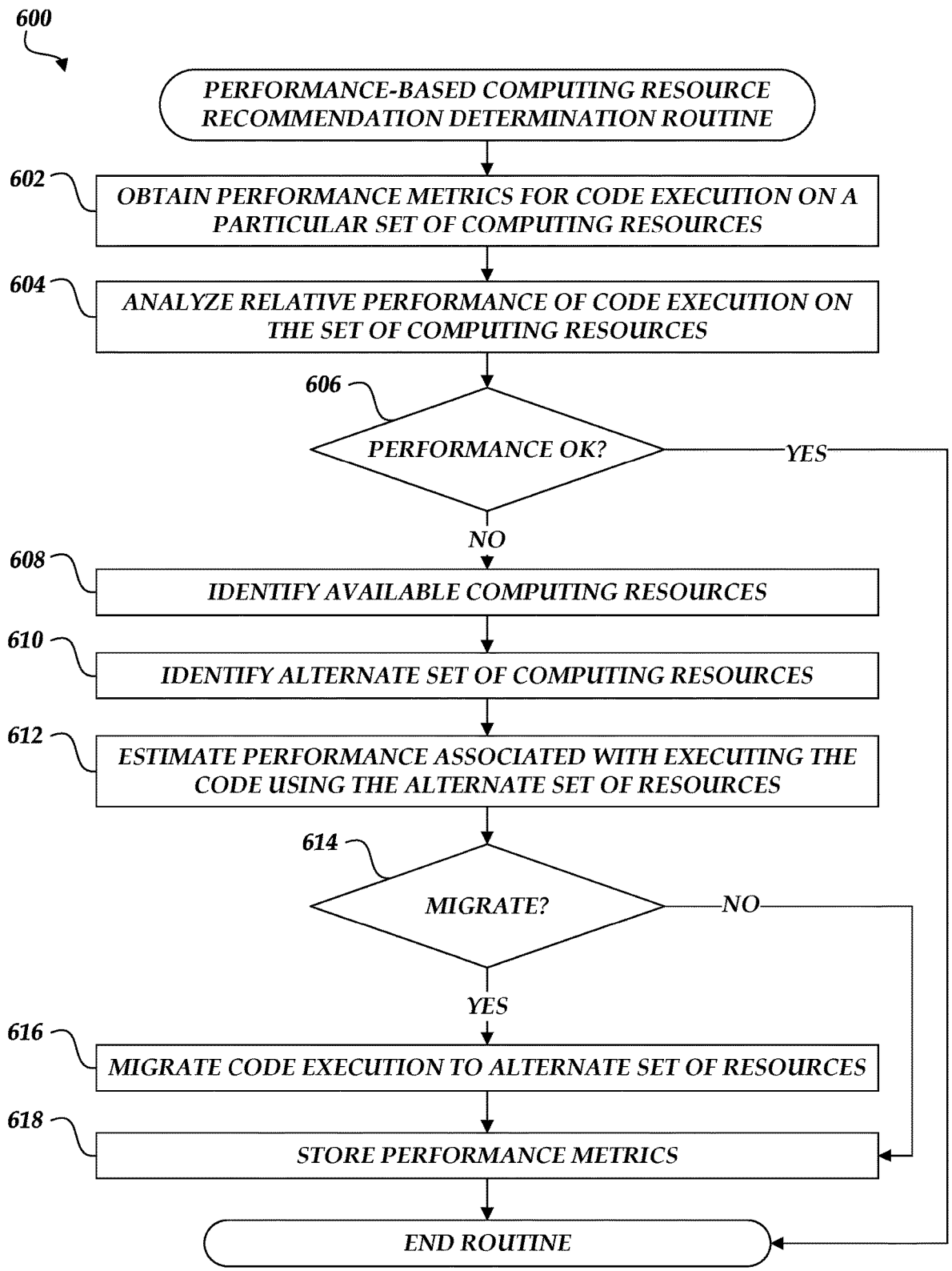
FIG. 6 is a flow chart depicting an illustrative routine for analyzing the performance of executing code with a particular set of resources on the on-demand code execution system of FIG. 1 and migrating code to alternate sets of resources as needed.

FIG. 6 is a flow diagram of an illustrative routine 600 for determining a set of computing resources to recommend based on an analysis of execution performance metrics. The routine 600 may be carried out, for example, by the execution analyzer 174 of FIG. 1. The routine 600 begins at block 602, where performance metrics may be obtained relating to the execution of user-submitted code for a specified task on a particular set of computing resources. In some embodiments, as described above, the performance metrics may be obtained during execution of the code. In further embodiments, performance metrics may be obtained periodically, in response to various events (e.g., computing resources becoming available or unavailable, the code invoking a particular library or API call, etc.), or based on other criteria. In other embodiments, the performance metrics may be obtained after the code has completed an execution.

At block 604, the performance metrics may be analyzed. In some embodiments, the performance metrics may be compared to a threshold or other criterion to assess whether the performance of the set of computing resources is satisfactory. For example, the performance metrics may be used to assess whether a number of instructions executed per clock cycle satisfies a threshold, or to assess whether code execution is completed within a time interval. In other embodiments, the performance metrics may be analyzed relative to other performance metrics, such as metrics obtained when executing the same or similar code on a different set of computing resources, metrics obtained when executing other code on the same set of computing resources, or an average or baseline performance metric.

At decision block 606, a determination may be made as to whether the relative performance of the set of computing resources when executing the user-submitted code is acceptable. If the relative performance is comparable to or better than a baseline, then the routine 600 may end without taking any measures to improve performance. In some embodiments, the routine 600 may branch to block 618 and store performance metrics or other information if the relative performance is better than average, and may use this information when making further recommendations as to which computing resources to use when executing user-submitted code for a particular task. In other embodiments, the routine 600 may branch to block 608 and consider migrating the task to other computing resources if the relative performance is higher than it needs to be. For example, the user may require that a particular task be completed within a specified amount of time, and the set of computing resources may enable completion of the task far more quickly than the user requires. The determination at decision block 606 may thus be that the task could be completed on a slower set of computing resources and still meet the user's performance requirements, and so the task should be migrated in order to free up the faster computing resources for more time-critical tasks.

If the determination at decision block 606 is that execution of the user-submitted code should be migrated to a different set of computing resources, then the routine 600 branches to block 608, where available computing resources may be identified. At block 610, the available computing resources may be analyzed to identify an alternate set of computing resources that may be used to execute the task, and at block 612 the performance of the alternate set of computing resources when executing the task may be estimated. In some embodiments, multiple sets of computing resources may be identified and analyzed, and block 612 may be carried out iteratively for each candidate set. In other embodiments, an alternate set of computing resources may be identified based on the relative performance of the current set of computing resources.

At decision block 614, a determination may be made as to whether execution of the user-submitted code should be migrated from the current set of computing resources to the alternate set of computing resources. In some embodiments, the determination may be as to whether the alternate set of computing resources would provide better performance based on the obtained and estimated performance metrics. For example, the determination may be that the alternate set of computing resources would execute more instructions per clock cycle than the current set of computing resources, and thus would lead to an improvement in performance. In other embodiments, the determination may as to whether the alternate set of computing resources provides acceptable performance based on criteria such as execution time, cost, resource utilization, or other metrics. In these embodiments, the current set of computing resources may provide higher performance than the current set of computing resources, but the other factors discussed above may lead to a determination to use the alternate set of computing resources. If the determination at decision block 614 is that the execution should not be migrated, then the routine 600 ends.

If the determination at decision block 614 is that the code execution should be migrated, then at block 616 the code execution is migrated to the alternate set of computing resources. At block 618, the obtained or estimated performance metrics may be stored to improve the accuracy of estimate or improve decision-making when initially allocating computing resources, as discussed above. The routine 600 then ends.

The blocks of the routines described above may vary in embodiments of the present disclosure. For example, in some implementations of either routine, the identification of available computing resources may be deferred or delegated to the worker manager 140, and the routine 500 or 600 may provide a recommendation that the worker manager 140 determines whether to implement, based on factors such as resource availability and the cost-benefit of migrating tasks from one set of resources to another. The routines may further include additional blocks, or the blocks of the routines may be rearranged, according to various embodiments.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A system comprising:
    a non-transitory data store storing information regarding physical and virtual processors, the information identifying, for each processor of the physical and virtual processors, an instruction set implemented by the processor from among a plurality of instruction sets implemented among the physical and virtual processors; and
    a computing device configured with executable instructions to:
        receive user-submitted code executable on an on-demand code execution system;
        identify an instruction set, from the plurality of instruction sets, associated with the user-submitted code, wherein the user-submitted code utilizes the instruction set when executed on the on-demand code execution system; and
        in response to a request to execute the user-submitted code:
            obtain availability information regarding a physical processor from the physical processors, that implements the instruction set;
            obtain first performance information regarding the physical processor;
            obtain second performance information regarding a virtual processor, from the virtual processors, that implements the instruction set;
            determine, based at least in part on the availability information, the first performance information, and the second performance information, a recommended processor for executing the user-submitted code, wherein the recommended processor is one of the physical processor and the virtual processor; and
            cause the on-demand code execution system to execute the user-submitted code on the recommended processor.

2. The system of claim 1, wherein the instruction set comprises a vector instruction set, floating point instruction set, fused multiply-add instruction set, neural network instruction set, tensor processing instruction set, single instruction multiple data instruction set, security instruction set, or cryptography instruction set.

3. The system of claim 1, wherein the instruction set is identified based at least in part on a software library invoked by the user-submitted code.

4. The system of claim 1, wherein the second performance information is associated with instantiating the virtual processor on a physical processor that does not implement the instruction set.

5. The system of claim 1, wherein the user-submitted code is compiled for the physical processor.

6. A computer-implemented method comprising:
    receiving user-submitted code executable on an on-demand code execution system;
    determining, based at least in part on the user-submitted code, computing resource functionality associated with executing the user-submitted code on the on-demand code execution system; and
    in response to a request to execute the user-submitted code:
        obtaining first performance information regarding a first computing resource that physically implements the computing resource functionality;
        obtaining second performance information regarding a second computing resource that does not physically implement the computing resource functionality but that virtually emulates the computing resource functionality;
        determining, based at least in part on the first performance information and the second performance information, a recommended computing resource for executing the user-submitted code, the recommended computing resource being one of the first computing resources or the second computing resource; and
        providing a recommendation that includes the recommended computing resource to the on-demand code execution system, wherein the on-demand code execution system selects a computing resource for executing the user-submitted code based at least in part on the recommendation.

7. The computer-implemented method of claim 6, wherein at least one of the first performance information and the second performance information was generated during a previous execution of the user-submitted code on the on-demand code execution system.

8. The computer-implemented method of claim 6 further comprising:
    obtaining, from the on-demand code execution system, performance metrics regrading execution of the user-submitted code with the selected computing resource;
    identifying, based at least in part on the performance metrics, an alternate computing resource; and
    providing an updated recommendation that includes the alternate computing resource to the on-demand code execution system, wherein providing the updated recommendation causes the on-demand code execution system to migrate execution of the user-submitted code to a different computing resource.

9. The computer-implemented method of claim 8, wherein the performance metrics include a number of processor instructions executed per clock cycle.

10. The computer-implemented method of claim 8 further comprising determining that the alternate computing resource is available.

11. The computer-implemented method of claim 6, wherein the first computing resource is a physical computing resource and the second computing resource is a virtual computing resource.

12. The computer-implemented method of claim 6 further comprising identifying, based at least in part on the computing resource functionality associated with executing the user-submitted code, the first computing resource and the second computing resource.

13. The computer-implemented method of claim 6 further comprising aggregating a plurality of previous recommendations for computing resources to determine a recommended hardware configuration for the on-demand code execution system.

14. The computer-implemented method of claim 13, wherein the recommended hardware configuration is based at least in part on one or more trends in the plurality of previous recommendations.

15. The computer-implemented method of claim 13, wherein the recommended hardware configuration is based at least in part on performance metrics.

16. The computer-implemented method of claim 6, wherein the first computing resource implements the computing resource functionality by emulating the computing resource functionality.

17. Non-transitory computer-readable media including computer-executable instructions that, when executed by an on-demand code execution system, cause the on-demand code execution system to:
obtain user-submitted code executable on the on-demand code execution system;
determine, based at least in part on the user-submitted code, computing resource functionality associated with executing the user-submitted code on the on-demand code execution system, wherein the on-demand code execution system does not receive a request to provide the computing resource functionality;
identifying a plurality of computing resources that implement the computing resource functionality;
in response to a request to execute the user-submitted code:
identifying an available subset of the plurality of computing resources that either physically implement or virtually emulate the computing resource functionality;
selecting, from the available subset, a recommended computing resource for executing the user-submitted code based at least in part on performance of individual computing resources in the available subset at providing the computing resource functionality; and
executing the user-submitted code on the recommended computing resource.

18. The non-transitory computer-readable media of claim 17 including further computer-executable instructions that, when executed by the on-demand code execution system, cause the on-demand code execution system to generate a prioritized list of computing resources based at least in part on performance estimates for individual computing resources in the plurality of computing resources.

19. The non-transitory computer-readable media of claim 17 including further computer-executable instructions that, when executed by the on-demand code execution system, cause the on-demand code execution system to determine, based at least in part on a performance estimate for an unavailable computing resource, to migrate at least one other task to make the unavailable computing resource available.

20. The non-transitory computer-readable media of claim 17, wherein the request to execute the user-submitted code specifies a preferred computing resource for executing the user-submitted code, and wherein the preferred computing resource does not provide the computing resource functionality.

21. The non-transitory computer-readable media of claim 20, wherein the recommended computing resource is determined based at least in part on comparing a performance estimate for executing the user-submitted code on the recommended computing resource to a performance estimate for executing the user-submitted code on the preferred computing resource.

* * * * *